United States Patent
Wang et al.

(10) Patent No.: US 10,827,327 B2
(45) Date of Patent: Nov. 3, 2020

(54) RELAY TRANSMISSION METHOD AND SYSTEM, AND RELATED DEVICE

(71) Applicant: HUAWEI TECHNOLOGIES CO., LTD., Shenzhen, Guangdong (CN)

(72) Inventors: Zhe Wang, Shenzhen (CN); Jun Zhang, Beijing (CN); Guangri Chen, Shenzhen (CN)

(73) Assignee: HUAWEI TECHNOLIGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/414,743

(22) Filed: May 16, 2019

(65) Prior Publication Data
US 2019/0274017 A1    Sep. 5, 2019

Related U.S. Application Data

(63) Continuation of application No. PCT/CN2016/112382, filed on Dec. 27, 2016.

(51) Int. Cl.
*H04W 4/46* (2018.01)
*H04W 8/24* (2009.01)
(Continued)

(52) U.S. Cl.
CPC .............. *H04W 4/46* (2018.02); *H04H 20/55* (2013.01); *H04L 12/189* (2013.01);
(Continued)

(58) Field of Classification Search
None
See application file for complete search history.

(56) References Cited

U.S. PATENT DOCUMENTS 8,630,579 B2 *  1/2014  Horiuchi ............ H04B 1/70735
                                                 370/315
2007/0030821 A1  2/2007  Iwamura et al.
(Continued)

FOREIGN PATENT DOCUMENTS

CN    101772122 A    7/2010
CN    102256333 A    11/2011
(Continued)

OTHER PUBLICATIONS

Hussain Rasheed et al., "On Secure, Privacy-Aware, and Efficient Beacon Broadcasting among One-Hop Neighbors in VANETs", 2014 IEEE Military Communications Conference, IEEE, Oct. 6, 2014, pp. 1427-1434, XP032686404.
(Continued)

*Primary Examiner* — Lana N Le
(74) *Attorney, Agent, or Firm* — Womble Bond Dickinson (US) LLP

(57) ABSTRACT

Embodiments of this application disclose a relay transmission method and system, and a related device. The method includes: determining, by a relay terminal, a vehicle existing between a vehicle terminal i and a vehicle terminal j based on vehicle location information in received broadcast messages sent by N vehicle terminals; and when it is obtained through calculation that link quality of a communication link $R_{ij}$ used when the vehicle terminal i and the vehicle terminal j communicate with each other is lower than a preset threshold, forwarding, to the vehicle terminal j, a broadcast message sent by the vehicle terminal i, and forwarding, to the vehicle terminal i, a broadcast message sent by the vehicle terminal j. A relay forwarding function of the relay terminal avoids communication interruption or communication distance limitation caused by blocking due to dynamic and unpredictable factors such as a large vehicle within the Internet of vehicles, thereby improving reliability of message transmission within the Internet of vehicles.

18 Claims, 14 Drawing Sheets

(51) Int. Cl.

| | | |
|---|---|---|
| *H04H 20/55* | (2008.01) | |
| *H04W 16/26* | (2009.01) | |
| *H04L 12/18* | (2006.01) | |
| *H04W 40/20* | (2009.01) | |
| *H04W 84/18* | (2009.01) | |
| *H04W 4/12* | (2009.01) | |
| *H04W 40/12* | (2009.01) | |
| *H04W 84/00* | (2009.01) | |
| *H04W 4/06* | (2009.01) | |
| *H04W 88/04* | (2009.01) | |
| *H04L 29/08* | (2006.01) | |
| *H04L 12/26* | (2006.01) | |
| *H04W 4/02* | (2018.01) | |

(52) U.S. Cl.
CPC ...... *H04L 12/1854* (2013.01); *H04L 12/1863* (2013.01); *H04W 4/06* (2013.01); *H04W 4/12* (2013.01); *H04W 8/24* (2013.01); *H04W 16/26* (2013.01); *H04W 40/12* (2013.01); *H04W 40/20* (2013.01); *H04W 84/005* (2013.01); *H04W 84/18* (2013.01); *H04L 43/0811* (2013.01); *H04L 67/12* (2013.01); *H04W 4/02* (2013.01); *H04W 88/04* (2013.01)

(56) References Cited

U.S. PATENT DOCUMENTS

| | | | |
|---|---|---|---|
| 2007/0104199 A1* | 5/2007 | Taha | H04L 45/16 370/392 |
| 2008/0009241 A1* | 1/2008 | Do | H04W 40/22 455/9 |
| 2008/0019321 A1* | 1/2008 | Kim | H04B 7/2606 370/332 |
| 2009/0197600 A1* | 8/2009 | Lee | H04H 20/12 455/434 |
| 2010/0008326 A1* | 1/2010 | Albanese | H04W 72/005 370/331 |
| 2010/0039947 A1* | 2/2010 | Li | H04L 1/0026 370/252 |
| 2010/0157826 A1* | 6/2010 | Yu | H04B 7/155 370/252 |
| 2011/0310788 A1 | 12/2011 | Lin et al. | |
| 2012/0108165 A1* | 5/2012 | Sawamoto | H04B 7/15535 455/11.1 |
| 2012/0176962 A1* | 7/2012 | Kimura | H04B 7/155 370/315 |
| 2017/0347338 A1* | 11/2017 | Chen | H04W 4/00 |
| 2019/0207668 A1* | 7/2019 | Koifman | H04B 7/14 |
| 2019/0253508 A1* | 8/2019 | Desai | H04L 67/12 |
| 2019/0261244 A1* | 8/2019 | Jung | H04W 36/0058 |

FOREIGN PATENT DOCUMENTS

| | | |
|---|---|---|
| CN | 102291795 A | 12/2011 |
| CN | 102612110 A | 7/2012 |
| CN | 102802228 A | 11/2012 |
| CN | 103338207 A | 10/2013 |
| CN | 104936267 A | 9/2015 |
| CN | 105228180 A | 1/2016 |
| CN | 106211026 A | 12/2016 |

OTHER PUBLICATIONS

Mate Boban et al., "Exploiting the height of vehicles in vehicular communication", Vehicular Networking Conference (VNC), 2011 IEEE, IEEE, Nov. 14, 2011, pp. 163-170, XP032081882.

Osama Abumansoor et al., "A Secure Cooperative Approach for Nonline-of-Sight Location Verification in Vanet" IEEE Transactions on Vehicular Technology, IEEE Service Center, vol. 61, No. 1, Jan. 1, 2012, pp. 275-285, XP011397245.

Anonymous,"Vehicular ad-hoc network-Wikipedia", Dec. 14, 2016 (Dec. 14, 2016), XP055706448, Retrieved from the Internet, total 4 pages.

* cited by examiner

RELAY TRANSMISSION METHOD AND SYSTEM, AND RELATED DEVICE

CROSS-REFERENCE TO RELATED APPLICATIONS

This application is a continuation of International Application No. PCT/CN2016/112382, filed on Dec. 27, 2016, the disclosure of which is hereby incorporated by reference in its entirety.

TECHNICAL FIELD

This application relates to the field of communications technologies, and in particular, to a relay transmission method and system, and a related device.

BACKGROUND

The Internet of things (IoT) is a network formed by implementing interworking between ubiquitous terminals through a wireless and/or wired communications network. With the rapid development of the Internet of things, the Internet of things plays an increasingly important role in the field of safe driving and intelligent transportation systems (ITS). In the field of safe driving, the Internet of things is also referred to as the Internet of vehicles, and implements safe driving mainly through vehicle-to-roadside-unit (RSU) communication, vehicle-to-vehicle communication (V2V), vehicle-to-network communication, and the like by exchanging broadcast messages of vehicles. For example, in V2V communication, a vehicle may broadcast messages such as a speed, a location, and a driving direction of the vehicle, and whether emergence brake has been slammed to a surrounding vehicle; and may also receive broadcast messages from the surrounding vehicle to learn a traffic status beyond a line of sight, allowing a driver or a vehicle driving system to predict and avoid a dangerous situation.

A largest difference of the Internet of vehicles from a common network (for example, the Internet) lies in that all network nodes within the Internet of vehicles may be dynamically moving, and therefore the Internet of vehicles has characteristics such as a time-variant network topology and instable link quality. Especially in the case of a radio communication link for V2V broadcasting, because of a limited deployment height for an in-vehicle antenna, radio signal propagation is vulnerable to impact of a surrounding environment, for example, fixed and predictable blocking by obstacles such as large-scale fading caused by buildings, trees, huge mountains, and terrains, resulting in V2V communication interruption or limitation to an operating distance of a communication link.

To resolve the problem of communication interruption or communication distance limitation, currently, when a network is being deployed, a V2V communication transmission distance is increased by simply increasing transmit power in some special locations (for example, an intersection with severe blocking) or by deploying a dedicated RSU in a fixed location to bypass an obstacle. However, these are all simple and rigid ways of relay forwarding, and the entire network is limited by mounting locations and a mounted quantity of RSUs. To improve reliability of V2V communication, a relatively large quantity of RSUs need to be deployed, resulting in relatively high costs of network construction. In addition, there are also some unpredictable and dynamically changing factors in the network, for example, blocking due to a large truck. If blocking occurs outside an RSU coverage area, V2V communication interruption or communication distance limitation is still a problem.

SUMMARY

Embodiments of this application disclose a relay transmission method and system, and a related device, to avoid V2V communication interruption or communication distance limitation caused by blocking due to factors such as a large truck and a building within the Internet of vehicles, and improve reliability of message transmission.

According to a first aspect, a relay transmission method is provided, including:

receiving, by a relay terminal, broadcast messages sent by N vehicle terminals, where the broadcast message includes vehicle location information, and N is a positive integer greater than 1;

determining, based on the vehicle location information in the received broadcast messages, a vehicle existing between a vehicle terminal i of the N vehicle terminals and a vehicle terminal j of the N vehicle terminals;

calculating link quality of a communication link $R_{ij}$ based on vehicle size information corresponding to the vehicle, where the $R_{ij}$ is a communication link used when the vehicle terminal i and the vehicle terminal j communicate with each other; and if the link quality of the $R_{ij}$ is lower than a preset threshold, forwarding, to the vehicle terminal j, a to-be-forwarded broadcast message sent by the vehicle terminal i, and forwarding, to the vehicle terminal i, a to-be-forwarded broadcast message sent by the vehicle terminal j.

Such a method when utilized can avoid V2V communication interruption or communication distance limitation caused by blocking due to dynamic and unpredictable factors such as a large truck within the Internet of vehicles, thereby improving reliability of message transmission.

According to one embodiment, before the receiving, by a relay terminal, broadcast messages sent by N vehicle terminals, the method further includes: sending, by the relay terminal, a relay capability indication message to a base station, where the relay capability indication message is used to indicate a relay capability and/or a relay location of the relay terminal; receiving relay configuration information sent by the base station, where the relay configuration information is used to instruct to enable a relay function of the relay terminal; and enabling the relay function of the relay terminal as instructed by the relay configuration information.

In one embodiment, the relay terminal may send the relay capability indication message to the base station in real time or periodically within the Internet of vehicles; or after receiving a relay capability reporting request sent by the base station, the relay terminal sends the relay capability indication message to the base station according to the relay capability reporting request. The relay capability indication message is used to indicate a relay capability (relay capability level) and/or a relay location of the relay terminal. The relay terminal receives relay configuration information configured and returned by the base station based on the relay capability (relay capability level) and/or the relay location of the relay terminal, to enable or disable the relay capability of the relay terminal according to the relay configuration information. Herein, the relay capability of the relay terminal may be enabled to complete a subsequent relay transmission procedure. In addition, the base station may flexibly configure (enable or disable) the relay capability of the relay terminal based on the relay capability and/or the relay location of the relay terminal, to better adapt to such a dynamically changing and unpredictable communications network as V2V.

In one embodiment, the relay terminal may determine, based on the vehicle location information in the received broadcast messages in combination with map information, obstacles existing between the vehicle terminal i and the vehicle terminal j; further, if the broadcast message includes vehicle size information, may further determine, by also consulting the vehicle size information in the broadcast messages, that obstacles likely to cause blocking exist between the vehicle terminal i and the vehicle terminal j on a signal propagation path, where the obstacles include the vehicle and a fixed obstacle; and then calculate the link quality of the communication link $R_{ij}$ based on the vehicle size information corresponding to the vehicle and size information corresponding to the fixed obstacle.

In addition to considering blocking due to a vehicle within the Internet of vehicles, blocking due to fixed obstacles such as a tree or a building within the Internet of vehicles may also be considered based on the map information; then the link quality of the $R_{ij}$ is calculated based on the size information corresponding to the vehicle and the size information corresponding to the fixed obstacle, so as to forward related broadcast message when the link quality of the $R_{ij}$ is lower than the preset threshold. This can avoid V2V communication interruption or communication distance limitation caused by blocking due to factors such as a large truck and a building within the Internet of vehicles, thereby greatly improving reliability of message transmission.

In one embodiment, the broadcast message includes vehicle size information, the relay terminal may determine, based on the vehicle location information and the vehicle size information in the received broadcast messages, that a vehicle likely to cause blocking exists between the vehicle terminal i and the vehicle terminal j. For example, a vehicle whose size exceeds a preset vehicle size threshold and that exists between the vehicle terminal i and the vehicle terminal j is considered as a vehicle likely to cause blocking. The preset vehicle size threshold herein may be an empirical value, obtained in advance from statistics, of a vehicle size that is prone to causing blocking. Therefore, in a process of calculating the link quality of the $R_{ij}$, calculation load of the relay terminal can be greatly reduced. Further, it may be determined, based on the map information, that obstacles likely to cause blocking exist between the vehicle terminal i and the vehicle terminal j. The obstacles herein include the vehicle and a fixed obstacle (for example, a tree or a building). Therefore, both blocking due to the vehicle and blocking due to the fixed obstacle in a surrounding environment are considered, thereby greatly improving reliability of message transmission.

In one embodiment, when the link quality of the $R_{ij}$ is lower than the preset threshold, the method further includes: predicting duration for which the link quality of the $R_{ij}$ is lower than the preset threshold, based on the vehicle, vehicle driving information corresponding to the vehicle terminal i, and vehicle driving information corresponding to the vehicle terminal j; and within the duration, forwarding, to the vehicle terminal j, the to-be-forwarded broadcast message sent by the vehicle terminal i, and forwarding, to the vehicle terminal i, the to-be-forwarded broadcast message sent by the vehicle terminal j, where the vehicle driving information includes vehicle driving speed information and vehicle driving direction information.

In one embodiment, the duration for which the link quality of the $R_{ij}$ is lower than the preset threshold may be predicted based on map information or path information. For example, in some special road segments (for example, a one-way street) in which overtaking is forbidden, the relay terminal predicts the duration for which the link quality of the $R_{ij}$ is lower than the preset threshold, based on the vehicle, the vehicle driving information corresponding to the vehicle terminal i, and the vehicle driving information corresponding to the vehicle terminal j; and within the duration, the relay terminal may directly forward, to the vehicle terminal j, the to-be-forwarded broadcast message sent by the vehicle terminal i, and forward, to the vehicle terminal i, the to-be-forwarded broadcast message sent by the vehicle terminal j, to reduce calculation load of the relay terminal.

In one embodiment, the broadcast message includes a message identifier, and before the forwarding, to the vehicle terminal j, the to-be-forwarded broadcast message sent by the vehicle terminal i, the method further includes:

when it is determined that a message identifier of a broadcast message sent by the vehicle terminal i is an identifier of an initially-sent message, determining the broadcast message sent by the vehicle terminal i as the to-be-forwarded broadcast message sent by the vehicle terminal i.

In one embodiment, the broadcast message includes a message identifier, and before the forwarding, to the vehicle terminal i, the to-be-forwarded broadcast message sent by the vehicle terminal j, the method further includes: when it is determined that a message identifier of a broadcast message sent by the vehicle terminal j is an identifier of an initially-sent message, determining the broadcast message sent by the vehicle terminal j as the to-be-forwarded broadcast message sent by the vehicle terminal j.

In one embodiment, when determining that the link quality of the $R_{ij}$ is lower than the preset threshold, the relay terminal uses the initially-sent broadcast message sent by the vehicle terminal i or the vehicle terminal j as the to-be-forwarded broadcast message sent by the vehicle terminal i or the vehicle terminal j, so as to correspondingly forward the to-be-forwarded broadcast message later. That is, the relay terminal forwards the initially-sent broadcast message sent by the vehicle terminal i or the vehicle terminal j.

In one embodiment, the broadcast message includes an aging time, and before the forwarding, to the vehicle terminal j, the to-be-forwarded broadcast message sent by the vehicle terminal i, the method further includes: when it is determined that a transmission time of broadcast information sent by the vehicle terminal i is within an aging time of the broadcast message, determining the broadcast message sent by the vehicle terminal i as the to-be-forwarded broadcast message sent by the vehicle terminal i.

Similarly, the broadcast message includes an aging time, and before the forwarding, to the vehicle terminal i, the to-be-forwarded broadcast message sent by the vehicle terminal j, the method further includes: when it is determined that a transmission time of broadcast information sent by the vehicle terminal j is within an aging time of the broadcast message, determining the broadcast message sent by the vehicle terminal j as the to-be-forwarded broadcast message sent by the vehicle terminal j.

In one embodiment, when determining that the link quality of the $R_{ij}$ is lower than the preset threshold, the relay terminal may determine a transmission time for sending a broadcast message from sending the broadcast message by the vehicle terminal i or the vehicle terminal j to the relay terminal to receiving the broadcast message by the relay terminal, then determine whether the transmission time of the broadcast message exceeds an aging time of the broadcast message, and if the transmission time of the broadcast message is within the aging time of the broadcast message, use the broadcast message as the to-be-forwarded broadcast message sent by the vehicle terminal i or the vehicle terminal j, so as to correspondingly forward the to-be-forwarded broadcast message later. That is, the relay terminal forwards a broadcast message that is sent by the vehicle terminal i or the vehicle terminal j and that is within an aging time (a valid life cycle). This avoids forwarding some invalid (inactive) broadcast messages, thereby improving reliability of message transmission.

In one embodiment, the broadcast message includes a message identifier, and before the forwarding, to the vehicle terminal j, the to-be-forwarded broadcast message sent by the vehicle terminal i, the method further includes: when it is determined that a message identifier of a broadcast message sent by the vehicle terminal i is an identifier of an initially-sent message, and that content of the broadcast message sent by the vehicle terminal i is different from that of another broadcast message, determining the broadcast message sent by the vehicle terminal i as the to-be-forwarded broadcast message sent by the vehicle terminal i, where the another broadcast message is a broadcast message sent by a vehicle terminal other than the vehicle terminal i.

Similarly, the broadcast message includes a message identifier, and before the forwarding, to the vehicle terminal i, the to-be-forwarded broadcast message sent by the vehicle terminal j, the method further includes: when it is determined that a message identifier of a broadcast message sent by the vehicle terminal j is an identifier of an initially-sent message, and that content of the broadcast message sent by the vehicle terminal j is different from that of another broadcast message, determining the broadcast message sent by the vehicle terminal j as the to-be-forwarded broadcast message sent by the vehicle terminal j, where the another broadcast message is a broadcast message sent by a vehicle terminal other than the vehicle terminal j.

In one embodiment, to reduce a forwarding quantity of the relay terminal, the relay terminal uses an initially-sent broadcast message sent by the vehicle terminal i or the vehicle terminal j as the to-be-forwarded broadcast message sent by the vehicle terminal i or the vehicle terminal j, where the content of the initially-sent broadcast message is different from that of the received broadcast message sent by another vehicle terminal (a vehicle other than the vehicle terminal i or the vehicle terminal j) within the Internet of vehicles, to help subsequent forwarding of the to-be-forwarded broadcast message. This avoids forwarding messages with duplicate content, and saves transmission resources of the relay terminal.

In one embodiment, the broadcast message includes a message identifier, and before the forwarding, to the vehicle terminal j, the to-be-forwarded broadcast message sent by the vehicle terminal i, the method further includes: when it is determined that a message identifier of a broadcast message sent by the vehicle terminal i is an identifier of an initially-sent message, and that content of the broadcast message sent by the vehicle terminal i is the same as that of another broadcast message, determining the broadcast message sent by the vehicle terminal i as the to-be-forwarded broadcast message sent by the vehicle terminal i, where the another broadcast message is a broadcast message sent by a vehicle terminal other than the vehicle terminal i, and a message identifier of the another broadcast message is an identifier of an initially-sent message.

Similarly, the broadcast message includes a message identifier, and before the forwarding, to the vehicle terminal i, the to-be-forwarded broadcast message sent by the vehicle terminal j, the method further includes: when it is determined that a message identifier of a broadcast message sent by the vehicle terminal j is an identifier of an initially-sent message, and that content of the broadcast message sent by the vehicle terminal j is the same as that of another broadcast message, determining the broadcast message sent by the vehicle terminal j as the to-be-forwarded broadcast message sent by the vehicle terminal j, where the another broadcast message is a broadcast message sent by a vehicle terminal other than the vehicle terminal j, and a message identifier of the another broadcast message is an identifier of an initially-sent message.

In one embodiment, to reduce a forwarding quantity of the relay terminal, the relay terminal uses an initially-sent broadcast message sent by the vehicle terminal i or the vehicle terminal j as the to-be-forwarded broadcast message sent by the vehicle terminal i or the vehicle terminal j, where content of the initially-sent broadcast message is the same as that of an initially-sent message that is received by the relay terminal and that is sent by another vehicle terminal (a vehicle other than the vehicle terminal i or the vehicle terminal j) within the Internet of vehicles, to help subsequent re-forwarding of the to-be-forwarded broadcast message. This avoids that the broadcast message is not forwarded successfully due to reasons such as poor link quality, thereby improving reliability of message transmission.

In one embodiment, the forwarding, to the vehicle terminal j, the to-be-forwarded broadcast message sent by the vehicle terminal i specifically includes:

forwarding, to the vehicle terminal j based on load information of a network forwarding link, the to-be-forwarded broadcast message sent by the vehicle terminal i, where the network forwarding link is a communication link used when the relay terminal and the vehicle terminal j communicate with each other.

Similarly, the forwarding, to the vehicle terminal i, the to-be-forwarded broadcast message sent by the vehicle terminal j specifically includes: forwarding, to the vehicle terminal i based on load information of a network forwarding link, the to-be-forwarded broadcast message sent by the vehicle terminal j, where the network forwarding link is a communication link used when the relay terminal and the vehicle terminal i communicate with each other.

In one embodiment, the relay terminal may control, based on actual load information of the network forwarding link, a forwarding frequency or forwarding frequentness of the to-be-forwarded broadcast message sent by the vehicle terminal i or the vehicle terminal j. For example, when the load information of the network forwarding link exceeds a preset load threshold, the relay terminal controls the forwarding frequency of the to-be-forwarded broadcast message sent by the vehicle terminal i or the vehicle terminal j to be a first frequentness, or controls the forwarding frequentness of the to-be-forwarded broadcast message sent by the vehicle terminal i or the vehicle terminal j to decrease. When the load information of the network forwarding link is lower than the preset load threshold, the relay terminal controls the forwarding frequentness of the to-be-forwarded broadcast message sent by the vehicle terminal i or the vehicle terminal j to be a second frequentness, or controls the forwarding frequentness of the to-be-forwarded broadcast message sent by the vehicle terminal i or the vehicle terminal j to increase. The first frequentness is less than the second frequentness. This can effectively adjust a message transmission rate, and avoids problems such as link congestion or link breakdown caused by transmission of excessive messages.

In one embodiment, the broadcast message includes a message property, and when the relay terminal has a plurality of to-be-forwarded broadcast messages to be sent to the vehicle terminal j or the vehicle terminal i, the method further includes: determining priorities of the plurality of to-be-forwarded broadcast messages based on message properties of the plurality of to-be-forwarded broadcast messages; and forwarding the plurality of to-be-forwarded broadcast messages to the vehicle terminal j or the vehicle terminal i based on load information of a network forwarding link and the priorities of the plurality of to-be-forwarded broadcast messages, where the network forwarding link is a communication link used when the relay terminal and the vehicle terminal j or the vehicle terminal i communicate with each other.

In one embodiment, the relay terminal may configure corresponding priorities for the to-be-forwarded broadcast messages based on the message properties of the to-be-forwarded broadcast messages; and then preferentially forward a to-be-forwarded broadcast message with a higher priority based on the load information of the network forwarding link, and then forward a to-be-forwarded broadcast message with a lower priority. For example, a priority configured for some broadcast messages (for example, an intersection collision warning message) that require a higher importance level or emergency level is a first priority, and a priority configured for some broadcast messages (for example, a vehicle speed notification message) that requires a lower importance level or emergency level is a second priority. The first priority is higher than the second priority.

In one embodiment, the message property includes one or a combination of more of the following: an importance level, an emergency level, an aging time, a message size, and other property information used to describe the broadcast message.

In one embodiment, the broadcast message includes a message identifier, and when the link quality of the $R_{ij}$ is lower than the preset threshold, the method further includes: when it is determined that a message identifier of a broadcast message sent by the vehicle terminal i is an identifier of an initially-sent message and that content of the broadcast message sent by the vehicle terminal i is the same as that of another broadcast message, discarding the broadcast message sent by the vehicle terminal i, where the another broadcast message is a broadcast message sent by a vehicle terminal other than the vehicle terminal i, and a message identifier of the another broadcast message is not an identifier of an initially-sent message.

In one embodiment, to reduce a forwarding quantity of the relay terminal, the initially-sent broadcast message sent by the vehicle terminal i may be discarded, where content of the initially-sent broadcast message is the same as that of the another broadcast message sent by the vehicle terminal other than the vehicle terminal i.

In one embodiment, the broadcast message includes a message identifier, and when the link quality of the $R_{ij}$ is lower than the preset threshold, the method further includes: when it is determined that a message identifier of a broadcast message sent by the vehicle terminal i is not an identifier of an initially-sent message, discarding the broadcast message sent by the vehicle terminal i.

In one embodiment, to reduce a forwarding quantity of the relay terminal, the forwarded broadcast message sent by the vehicle terminal i may be discarded, in particular, when link load is considerably high. This avoids problems such as link congestion or a relatively long message transmission delay caused by excessive messages, thereby improving reliability of message transmission.

In one embodiment, the broadcast message includes an aging time, and when the link quality of the $R_{ij}$ is lower than the preset threshold, the method further includes: when it is determined that a transmission time of broadcast information sent by the vehicle terminal i exceeds an aging time of the broadcast message, discarding the broadcast information sent by the vehicle terminal i.

In one embodiment, to improve effective message transmission of the relay terminal, some broadcast messages that exceed their aging times may be discarded.

According to a second aspect, another relay transmission method is provided, including:

receiving, by a base station, relay capability indication messages sent by M relay terminals, where the relay capability indication message is used to indicate a relay capability and/or a relay location of the relay terminal, and M is a positive integer greater than 0;

generating corresponding relay configuration information for the M relay terminals based on relay capabilities and/or relay locations in the received relay capability indication messages, where the relay configuration information is used to instruct to enable or disable a relay function of the relay terminal; and sending the generated relay configuration information to the corresponding relay terminals, to control enabling or disabling of relay functions of the relay terminals.

By practicing the method described in the second aspect, the base station can flexibly configure the corresponding relay configuration information for the M relay terminals based on the relay capabilities and/or the relay locations of the corresponding relay terminals, in the M relay capability indication messages received within the Internet of vehicles, to control enabling or disabling of the relay functions of the corresponding relay terminals. This can flexibly and dynamically control enabling or disabling of relay functions of all or some relay terminals within the Internet of vehicles, and thereby prepare for relay forwarding processing.

In one embodiment, before the generating corresponding relay configuration information for the M relay terminals, the method further includes: receiving, by the base station, broadcast messages sent by N vehicle terminals, where the broadcast message includes vehicle location information, and N is a positive integer greater than 1; and the generating corresponding relay configuration information for the M relay terminals based on relay capabilities and/or relay locations in the received relay capability indication messages specifically includes: generating the corresponding relay configuration information for the M relay terminals based on the relay capabilities and/or the relay locations in the received relay capability indication messages and the vehicle location information in the received broadcast messages.

In one embodiment, the base station may generate/configure the corresponding relay configuration information for the M relay terminals more appropriately and accurately based on the relay capabilities and/or the relay locations of the M relay terminals within the Internet of vehicles in combination with a geographical distribution of the N vehicle terminals within the Internet of vehicles. For example, in some areas with a relatively high traffic density, enabling of relay functions of a few (lower than the preset threshold) relay terminals is allowed, to avoid problems such as a repeated message forwarding or an increase of communication load of the relay terminals.

In one embodiment, if the M relay capability indication messages received include at least two levels of relay capabilities, relay configuration information corresponding to a relay terminal with a higher-level relay capability is used to instruct to preferentially enable a relay capability of the relay terminal with the higher-level relay capability.

In one embodiment, if the relay capability indication messages sent by the M relay terminals include at least two levels of relay capabilities, the base station may preferentially configure and enable the relay terminal with the higher-level relay capability, and then configure and enable or disable a relay terminal with a lower-level relay capability. In this way, relay resources are used appropriately while a network coverage area is increased.

According to a third aspect, a relay terminal is provided, including function units configured to perform the method in the first aspect.

According to a fourth aspect, a base station is provided, where the base station includes function units configured to perform the method in the second aspect.

According to a fifth aspect, a relay terminal is provided, including a storage unit, a communications interface, and a processor coupled to the storage unit and the communications interface, where the storage unit is configured to store an instruction, the processor is configured to execute the instruction, and the communications interface is configured to communicate with another device under control of the processor; and when the processor executes the instruction, the method described in the first aspect is performed.

According to a sixth aspect, a base station is provided, including a storage unit, a communications interface, and a processor coupled to the storage unit and the communications interface, where the storage unit is configured to store an instruction, the processor is configured to execute the instruction, and the communications interface is configured to communicate with another device under control of the processor; and when the processor executes the instruction, the method described in the second aspect is performed.

According to a seventh aspect, a relay transmission system is provided, including a relay terminal and N vehicle terminals, where the N vehicle terminals form the Internet of vehicles, the N vehicle terminals are configured to send broadcast messages to the relay terminal, and the broadcast message includes vehicle location information; and the relay terminal may be the relay terminal described in the third aspect or the fifth aspect.

In one embodiment, the relay transmission system further includes a base station, where the base station may be the base station described in the fourth aspect or the sixth aspect.

According to an eighth aspect, a computer readable storage medium is provided, where the computer readable storage medium stores program code used for relay transmission processing, and the program code includes an instruction used to perform the method described in the first aspect.

According to a ninth aspect, a computer readable storage medium is provided, where the computer readable storage medium stores program code used for relay transmission processing, and the program code includes an instruction used to perform the method described in the second aspect.

Practicing the embodiments of this application can avoid V2V communication interruption or communication distance limitation caused by blocking due to factors such as a large truck and a building within the Internet of vehicles, thereby improving reliability of message transmission.

BRIEF DESCRIPTION OF DRAWINGS

To describe the technical solutions in the embodiments of this application or in the prior art more clearly, the following briefly describes the accompanying drawings required for describing the embodiments or the prior art.

DESCRIPTION OF EMBODIMENTS

The following describes the technical solutions in the embodiments of this application in detail with reference to the accompanying drawings in this application.

Figure 1A:
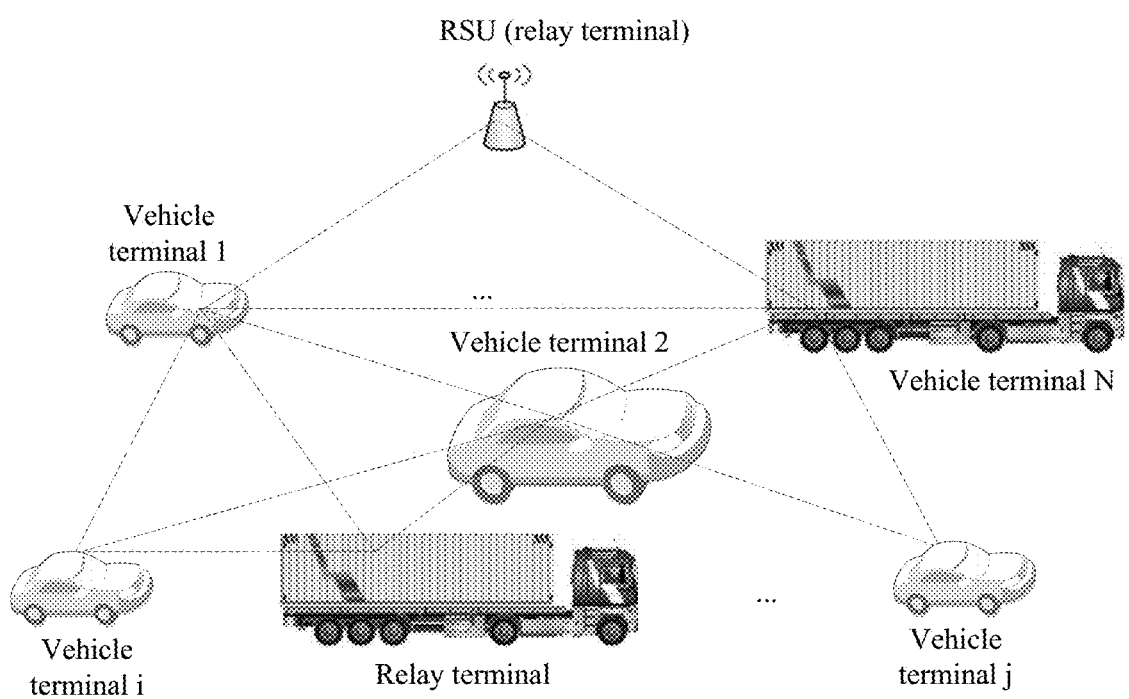
FIG. 1A is a schematic diagram of a network architecture according to an embodiment of this application.

As shown in FIG. 1A, a possible network architecture includes M relay terminals and N vehicle terminals, where M is greater than 0, N is greater than 1, and both M and N are positive integers. The relay terminal and the vehicle terminal may be vehicles themselves, may be in-vehicle terminals mounted on vehicles, or may be in-vehicle terminals with established communication connection to vehicles. The in-vehicle terminal herein may include a terminal device having a communication network function, for example, an in-vehicle mobile phone or an in-vehicle band. The relay terminal may be a roadside unit (RSU) mounted at a roadside, or may be a vehicle terminal having a relay (e.g., forwarding) capability. There may be one or more relay terminals. This is not limited herein.

The N vehicle terminals may be vehicle terminals without a relay capability, or may be vehicle terminals some or all of whom are provided with a relay capability (that is, relay terminals). In addition, the N vehicle terminals and/or the M relay terminals may be located in/form one Internet of vehicles. Mutual communication may be performed between the relay terminals and the vehicle terminals and between the vehicle terminals through a network.

Considering that additional device costs are caused by providing a relay capability on a vehicle terminal, during actual application, some or all vehicle terminals in one Internet of vehicles are allowed to have a relay capability. In addition, when there are a plurality of relay terminals in one Internet of vehicles, in consideration of reasons such as device costs or network overheads, a relay capability may be enabled on some or all of the relay terminals, so as to implement a relay forwarding function. Furthermore, all the relay terminals may have a same relay capability level or different relay capability levels. To be specific, it is allowed that some vehicle terminals are provided with a higher-level relay capability and some vehicle terminals provided with a lower-level relay capability, and it is also applicable that some vehicle terminals are not provided with any relay forwarding capability. This is not limited in the embodiments of this application.

It should be noted that a relay capability of a relay terminal may have been determined by a manufacturer before delivery, and a relay capability level of the relay terminal may be categorized/determined based on one or a combination of more of a relay function readiness, a calculation capability, and a coverage capability that are supported by the relay terminal, accuracy with a used geographical map model and a used modeling method for channel quality (link quality) estimation, and other impact factors affecting the relay capability level of the relay terminal. Different relay terminals may have a same level or different levels of relay (forwarding) capabilities.

For example, for some in-vehicle terminals deployed on a large truck, a coverage area is larger due to a greater antenna deployment height of the terminal. Also, because a three-dimensional electronic map model is used, and channel/link quality is estimated by using a geometry-based deterministic model estimation method based on ray tracing (ray-tracing), accuracy of an estimation algorithm of the terminal is higher. Therefore, the in-vehicle terminals have a higher relay capability level. For another example, for some in-vehicle terminals deployed on a small-scale passenger car, a coverage area is limited due to a lower antenna deployment height. Also, because a relatively simple two-dimensional electronic map model is used, and channel/link quality is estimated by using a geometry-based statistical model estimation method, calculation precision of an estimation algorithm of the terminal is lower. Therefore, the in-vehicle terminals have a lower relay capability level.

Figure 1B:
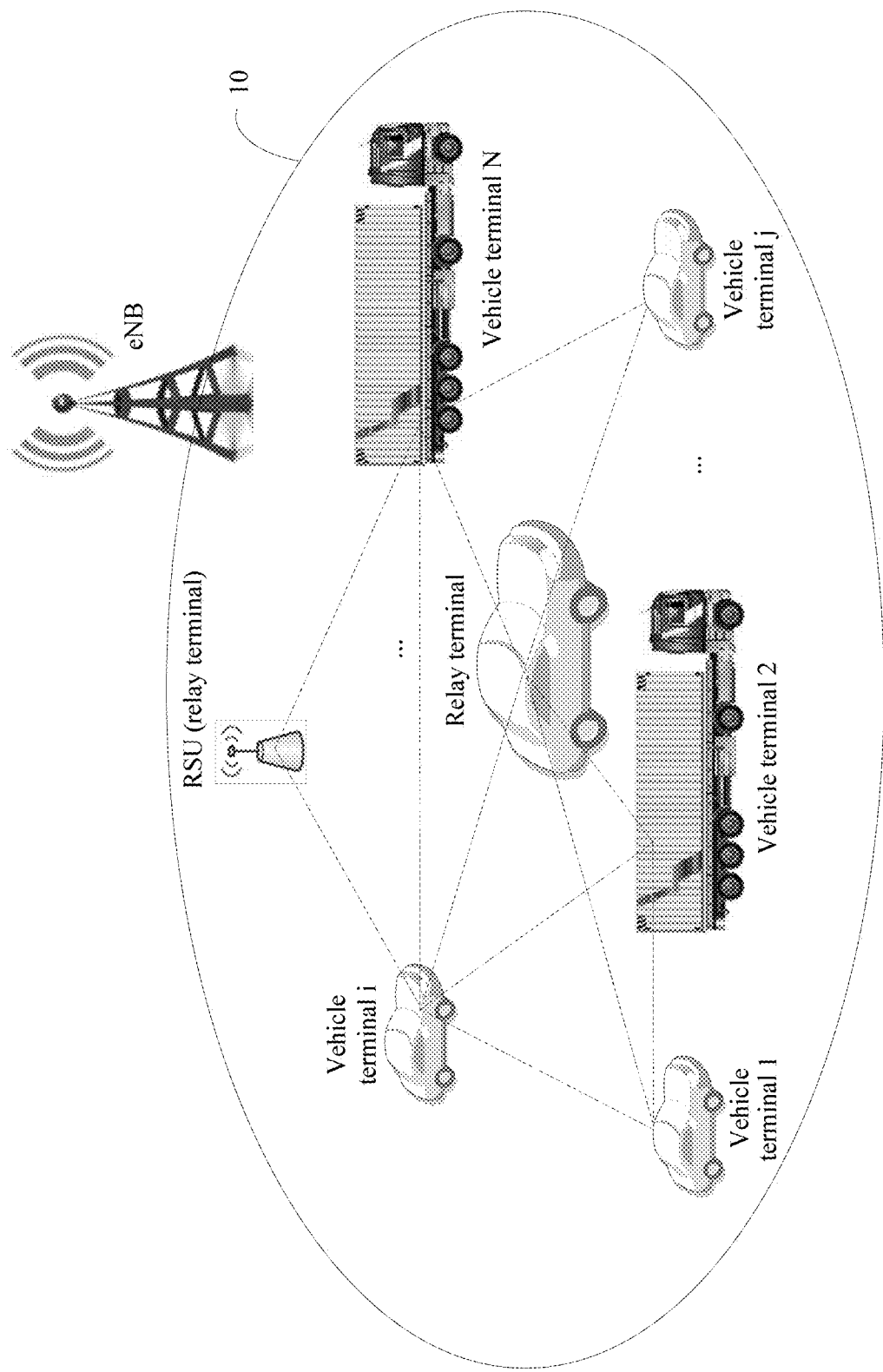
FIG. 1B is a schematic diagram of another network architecture according to an embodiment of this application.

As shown in FIG. 1B, for example, another possible network architecture includes M relay terminals, N vehicle terminals, and a base station (which is also referred to as a network side, shown as an eNB (evolved NodeB, evolved NodeB, eNB for short)). For details of related descriptions of the relay terminals and the vehicle terminals, refer to FIG. 1A, and no details are repeated herein. Mutual communication may be performed between the relay terminals, the vehicle terminals, and the network side (base station) through a network. An ellipse line box 10 in FIG. 1B represents a network coverage area of the base station eNB, and all vehicle terminals and all relay terminals (including an RSU) in the ellipse line box 10 are located within one Internet of vehicles.

It should be noted that the network architecture shown in FIG. 1A or FIG. 1B is also a schematic structural diagram of a relay transmission system provided in an embodiment of this application. The relay transmission system includes M relay terminals and N vehicle terminals; and optionally, may further include a network side (a base station). For specific implementation of the relay transmission system, also refer to corresponding descriptions of the method embodiments shown in FIG. 2A to FIG. 2C and FIG. 4A to FIG. 4Cb.

Figure 2A:
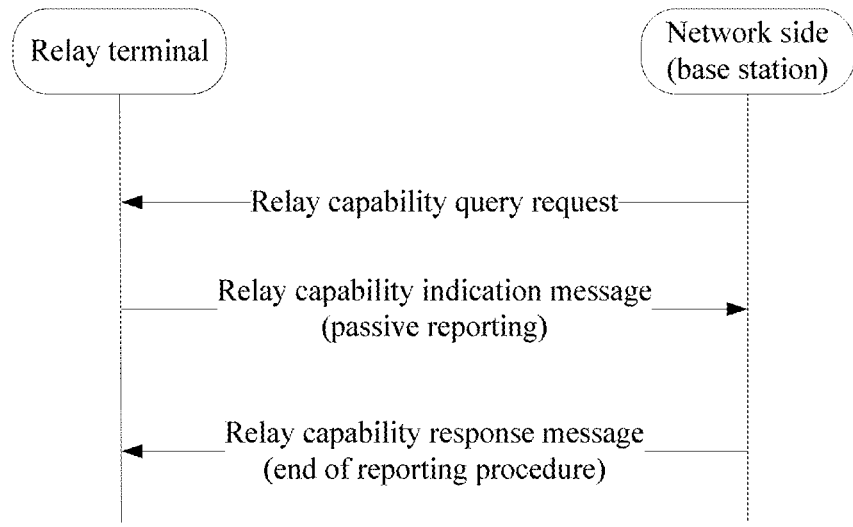
FIG. 2A is a schematic flowchart of relay capability reporting according to an embodiment of this application.
Figure 2B:
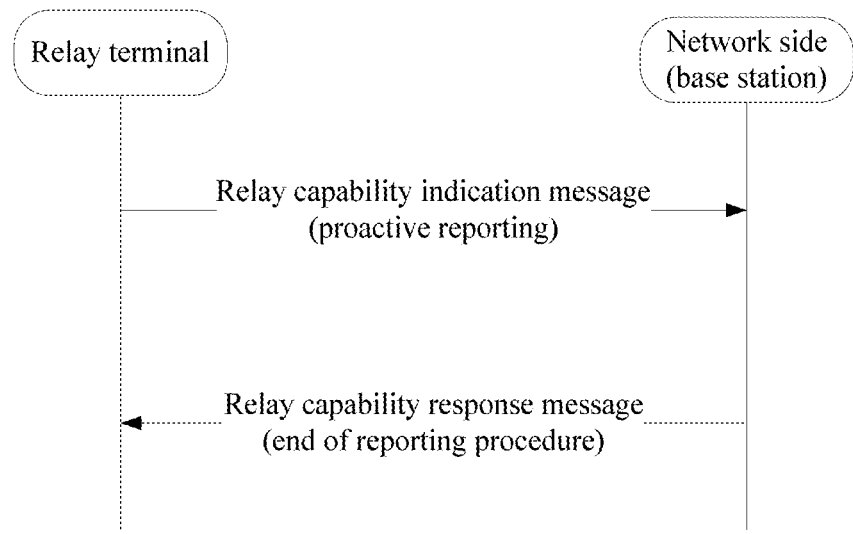
FIG. 2B is another schematic flowchart of relay capability reporting according to an embodiment of this application.
Figure 2C:
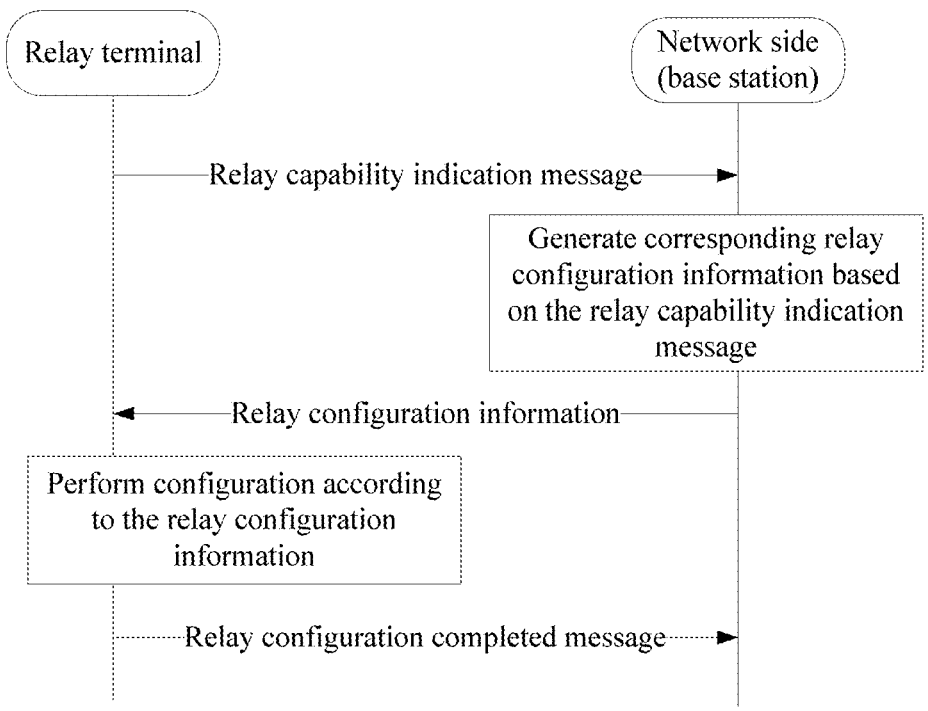
FIG. 2C is a schematic flowchart of configuring relay configuration information according to an embodiment of this application.

Based on the network architecture shown in FIG. 1B, the following separately describes some possible schematic flowcharts of methods for reporting and configuring a relay capability of a relay terminal in the solutions of this application with reference to the related accompanying drawings shown in FIG. 2A to FIG. 2C.

FIG. 2A is a schematic flowchart of relay capability reporting. A network side (a base station) may proactively send a relay capability query request to all or some vehicle terminals and/or relay terminals in the Internet of vehicles. The relay capability query request is used to learn whether a vehicle terminal is provided with a relay capability, and if the vehicle terminal is provided with a relay capability, learn of a corresponding relay capability level; or is used to obtain a corresponding relay capability level of a relay terminal. During actual application, the network side usually broadcasts a relay capability query request to all vehicle terminals and all relay terminals in the Internet of vehicles, so that the vehicle terminals and the relay terminals return and report respective information such as relay capabilities (relay capability levels) and relay locations.

Correspondingly, a vehicle terminal may receive a relay capability query request sent by the network side (base station, shown as cellular), and respond to the relay capability query request to report information such as a relay capability and a geographical location of the vehicle terminal to the network side. Similarly, when receiving a relay capability query request delivered by the network side, a relay terminal may report a relay capability level (which may also be referred to as a hierarchical relay capability) of the relay terminal to the network side. During actual application, the vehicle terminal or the relay terminal may send a corresponding relay capability indication message to the network side. The relay capability indication message is used to indicate whether the vehicle terminal or the relay terminal is provided with a relay capability, and may further report a corresponding relay capability level if the vehicle terminal or the relay terminal is provided with a relay capability.

In addition, the relay capability indication message may be further used to indicate location information of the vehicle terminal or the relay terminal. For example, when the vehicle terminal is provided with a relay capability (or may be considered as a relay terminal), the relay capability indication message may further report location information of the vehicle terminal, that is, a relay location of the relay terminal, to the network side, so that the network side configures a corresponding relay policy.

Correspondingly, after receiving the relay capability indication message sent by the vehicle terminal or the relay terminal, the network side may send a corresponding relay capability response message to the vehicle terminal or the relay terminal, to notify the vehicle terminal or the relay terminal that a relay capability reporting procedure has ended. In an optional solution, the operation of sending a corresponding relay capability response message may alternatively be omitted.

For another example, FIG. 2B is another schematic flowchart of relay capability reporting. N vehicle terminals and M relay terminals that are located in the Internet of vehicles may send relay capability indication messages to a network side automatically in real time or periodically; or a vehicle terminal or a relay terminal may send a relay capability indication message to a network side automatically when entering the Internet of vehicles. The relay capability indication message includes a relay capability (whether a relay capability is provided and a corresponding relay capability level) of the vehicle terminal or the relay terminal, and may further include information such as location information of the vehicle terminal or a relay location of the relay terminal.

Correspondingly, the network side may receive the corresponding relay capability indication messages sent by the vehicle terminals or the relay terminals, and the network side may further send relay capability response messages to the corresponding vehicle terminals or relay terminals, so as to notify the corresponding vehicle terminals or relay terminals that a relay capability reporting procedure has ended. In an optional solution, the operation of sending a relay capability response message may alternatively be omitted.

FIG. 2C is a schematic flowchart of configuring relay configuration information. After receiving the relay capability indication messages sent by the foregoing relay terminals (the M relay terminals), a network side (a base station) may generate corresponding relay configuration information based on information such as relay capabilities (whether a relay capability is provided and corresponding relay capability levels) of the relay terminals and relay locations of the relay terminals in the relay capability indication messages. Optionally, the network side may deliver the relay configuration information to the corresponding relay terminals, to control enabling or disabling of relay functions of the corresponding relay terminals.

In an embodiment of this application, the network side may perform comprehensive analysis based on information reported by each vehicle (which may include a relay terminal) in the Internet of vehicles, for example, whether the vehicle terminal is provided with a relay capability, a corresponding relay capability level, and a relay location, in combination with information such as a relay capability and a relay location of a fixedly mounted RSU in the Internet of vehicles and even information such as a road traffic status and whether a vehicle quantity exceeds a preset quantity threshold (whether congestion is present) in the current Internet of vehicles, to generate a corresponding relay configuration policy for each vehicle terminal. The relay configuration policy is used to determine whether to enable or disable a relay function of a relay terminal and in which location the relay terminal is.

In another embodiment of this application, the network side may preferentially consider enabling a relay function of a relay terminal with a higher relay capability level. That is, if M relay capability indication messages received include at least two levels of relay capabilities, relay configuration information configured/generated for a relay terminal corresponding to a higher-level relay capability is used to instruct to enable a relay function of the corresponding relay terminal.

Correspondingly, a relay terminal receives corresponding relay configuration information delivered by the network side, and then may enable or disable a relay function of the relay terminal based on corresponding relay configuration information. In addition, after configuring (enabling or disabling) the relay capability of the relay terminal based on the corresponding relay configuration information received, the relay terminal may further send a corresponding relay configuration completed message to the network side, so as to notify the network side that the relay terminal has enabled or disabled the relay function of the relay terminal currently.

Figure 3A:
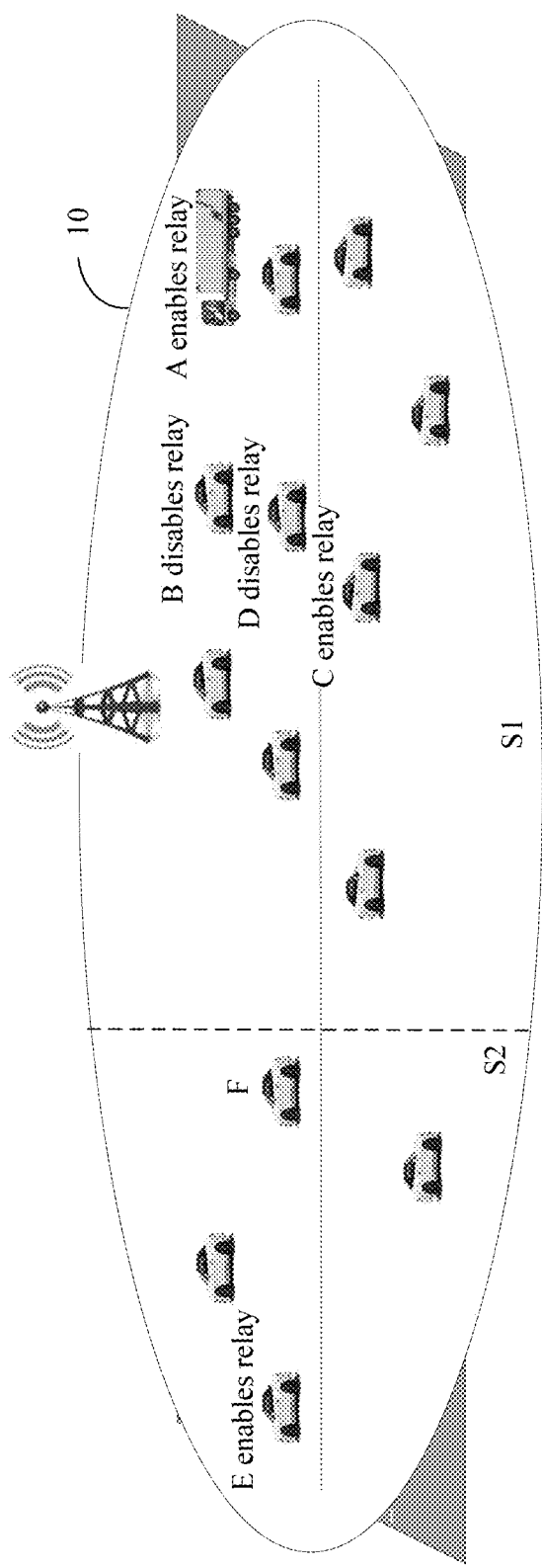
FIG. 3A is a schematic diagram of a scenario of configuring relay configuration information according to an embodiment of this application.

For ease of understanding, for example, in the following, FIG. 3A is a schematic diagram of a scenario of configuring relay configuration information. All (14 as shown in the figure) vehicle terminals in one Internet of vehicles may send respective relay capability indication messages to a network side (base station, eNB) periodically (for example, every five minutes). The network side may determine a distribution of the vehicle terminals within the Internet of vehicles after receiving the relay capability indication messages sent by the vehicle terminals (including a relay terminal). As shown in FIG. 3A, most vehicle terminals are located in an area S1, a few vehicle terminals are located in an area S2, and S1 and S2 are separated only by a dotted line. In addition, the network side may further learn that the area S1 includes three vehicle terminals provided with a relay capability, the area S2 includes two vehicle terminals provided with a relay capability, and the rest vehicle terminals are not provided with any relay capability. In other words, the area S1 includes three relay terminals, and the area S2 includes two relay terminals. In addition, relay capability levels of the five relay terminals in the areas S1 and S2 are $A>B>C>D>E$.

The network side may generate a corresponding relay configuration policy based on a vehicle terminal distribution (location information) in the areas S1 and S2 and relay capability levels of the vehicle terminals, so that the vehicle terminals enable or disable relay capabilities of the vehicle terminals according to the relay configuration information. In consideration of uniform distribution of the vehicle terminals provided with a relay capability, the network side may choose to generate and configure relay configuration information used to enable relay capabilities of vehicle terminals A, C, and E, and disable relay capabilities of vehicle terminals B and D, while the rest vehicle terminals are not provided with any relay capability. An objective of this is to ensure that the relay (forwarding) capabilities of the vehicle terminals can cover the entire Internet of vehicles or road as much as possible; in addition, overlapping coverage areas occurring after relay capabilities of a plurality of vehicle terminals are enabled, as a result of which more relay transmission services are carried within the overlapping coverage areas, can be reduced.

In one embodiment, the network side further considers preferentially enabling a relay function of a relay terminal with a higher relay capability level. For example, vehicle terminals A and B that drive in a same direction in the area S1 are adjacent vehicles; the vehicle terminal A is deployed on a large truck or the vehicle terminal A is a large truck, an antenna deployment height of the vehicle terminal A is higher, and a relay capability level of the vehicle terminal A is higher, and therefore the network side preferentially chooses to make configuration to enable a relay function of the vehicle terminal A with the higher relay capability level and disable a relay function of the vehicle terminal B. However, in the area S2, because vehicles are deployed sparsely, in the entire area S2, a vehicle terminal E is only one provided with a relay capability and has a smallest relay capability level. To ensure a complete relay forwarding coverage area of the Internet of vehicles, the network side makes further configuration to enable a relay function of a vehicle terminal E.

In one embodiment, the network side further selects and configures a corresponding relay configuration policy based on location information of a vehicle terminal provided with a relay capability. For example, for the area S1 in which vehicles are densely distributed, although the area S1 includes four vehicle terminals provided with a relay capability (that is, relay terminals), because transmission efficiency drops due to aggravated link load caused by excessive relay forwarding, the network side may appropriately configure and enable relay functions of a few vehicle terminals. For example, in this example, relay capabilities of only vehicle terminals A and C are enabled. For the area S2 in which vehicles are sparsely distributed, in an actual communication process, link load may be relatively low, and a vehicle driving speed of a vehicle on which a vehicle terminal is located may be relatively high (exceeding a preset speed threshold); or when some broadcast messages have relatively high requirements on a propagation distance and reliability, if a plurality of vehicle terminals in the area S2 are provided with a relay capability, the network side may select/enable relay functions of more vehicle terminals depending on an actual situation. For example, if a vehicle terminal F in the area S2 is also provided with a relay capability, the network side may configure relay configuration information used to enable relay capabilities of vehicle terminals E and F.

It should be noted that when a vehicle terminal provided with a relay capability (that is, a relay terminal) departs from the Internet of vehicles or a vehicle terminal provided with a relay capability is outside a network coverage area, in a subsequent driving process, the vehicle terminal may select a default relay configuration policy to configure a relay function of the vehicle terminal, for example, enabling or disabling the relay capability of the vehicle terminal by default; or the vehicle terminal may select last relay configuration information used when the vehicle terminal last enters the Internet of vehicles, and correspondingly enable or disable a relay capability of the vehicle terminal based on the last relay configuration information.

Figure 3B:
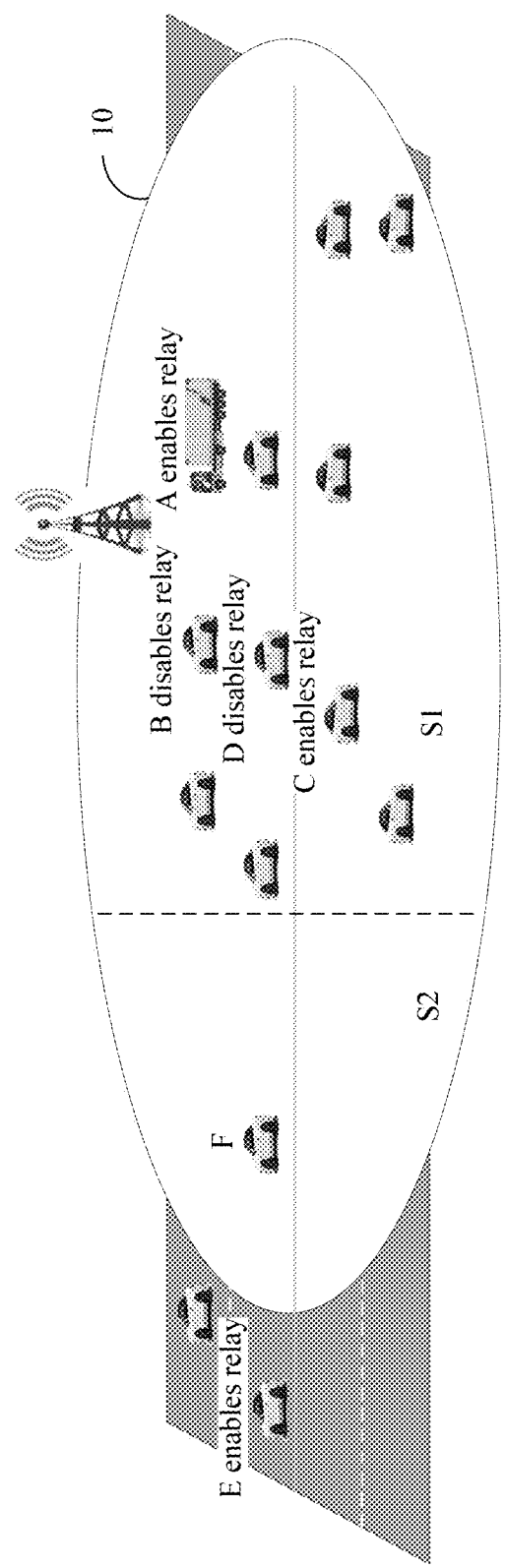
FIG. 3B is a schematic diagram of another scenario of configuring relay configuration information according to an embodiment of this application.

For example, FIG. 3B is a schematic diagram of another scenario of configuring relay configuration information. When a vehicle terminal E departs from the Internet of vehicles 10, the vehicle terminal E may select a prestored default relay configuration policy to configure and disable a relay function of the vehicle terminal E; or the vehicle terminal E may continue to enable a relay function of the vehicle terminal E based on relay configuration information previously used in the Internet of vehicles, so as to help a vehicle terminal with poor link quality (the link quality is lower than a preset threshold) to forward a related broadcast message.

Figure 4A:
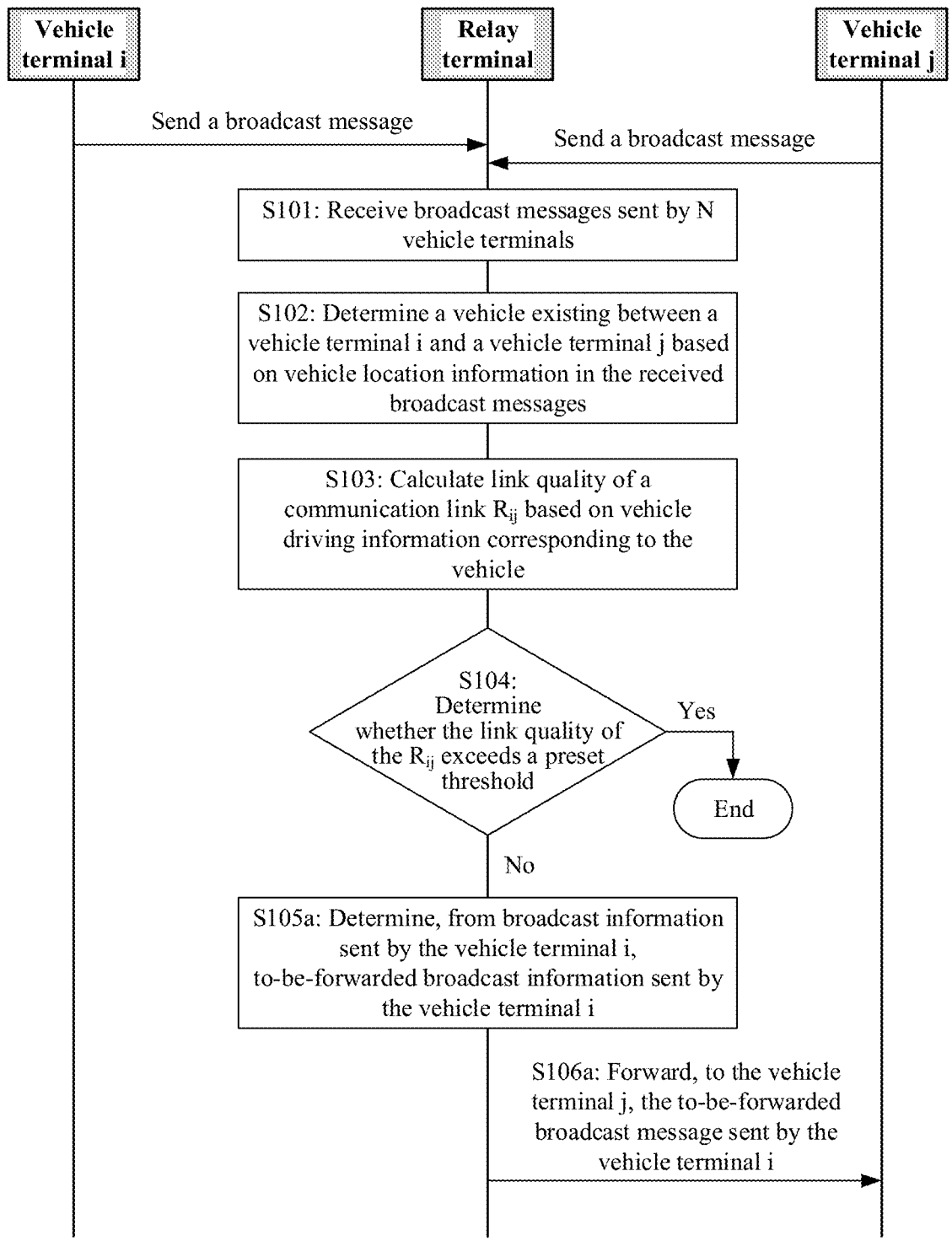
FIG. 4A is a schematic flowchart of a relay transmission method according to an embodiment of this application.

Based on the network architecture shown in FIG. 1A or FIG. 1B, FIG. 4A is a schematic flowchart of a relay transmission method according to an embodiment of this application.

Operation S101: A relay terminal receives broadcast messages sent by N vehicle terminals, where the broadcast message includes vehicle location information, and the N vehicle terminals form the Internet of vehicles;

In one embodiment of this application, mutual communication connection may be established in a wired or wireless communication manner between the relay terminal and the N vehicle terminals that are located within the same Internet of vehicles. The wireless communication manner may include Wi-Fi (Wireless Fidelity), Bluetooth, Zigbee, D2D (Device to Device) communication connection based on Long Term Evolution (LTE), and other manners. Each vehicle terminal within the Internet of vehicles may send a respective broadcast message to other vehicle terminals and the relay terminal within the Internet of vehicles, so as to notify the other vehicle terminals and the relay terminal of vehicle status information of the vehicle terminal, for example, a vehicle driving speed, a vehicle driving direction, whether an emergency brake has been slammed, or whether a traffic crash has taken place. Correspondingly, the relay terminal may receive broadcast messages sent by all vehicle terminals within the Internet of vehicles, to be specific, the broadcast messages sent by the N vehicle terminals within the Internet of vehicles.

The broadcast message includes a vehicle identity, and the vehicle identity is used to identify by which vehicle the broadcast message is sent. The vehicle identity may include a vehicle brand, a license plate number, and the like. The broadcast message may further include vehicle status information, for example, vehicle location information, a vehicle driving speed, a vehicle driving direction, whether an emergency brake has been slammed, or whether a traffic crash has taken place. In addition, the broadcast message may further include one or a combination of more of the following information: vehicle size information, vehicle type information, a message property, a message identifier, and other information used to describe to-be-carried message content.

The vehicle size information or the vehicle type information is information used to describe a vehicle size. Vehicles may be usually categorized into the following several vehicle types by vehicle size: a minibus, a coach, a cargo vehicle with a trailer, or the like. The message property may be used to evaluate importance or a priority of the broadcast message. The message property includes one or a combination of more of the following: an importance level, an emergency level, time validity (that is, an aging time), a message size, and other property information used to describe the broadcast message. The message identifier may be used to identify whether a broadcast message is a first forwarded message, that is, an initially-sent message, or a (relayed) forwarded message forwarded by another relay terminal. The aging time herein may be a valid life cycle or a valid acting time of a broadcast message.

In one embodiment, to satisfy communications protocols such as the TCP/IP (Transmission Control Protocol/Internet Protocol) protocol, a broadcast message is actually transmitted in a form of a data packet. Content information included in the broadcast message is actually encapsulated in a data packet in a form of a field. For example, a location field in a data packet is used to carry/encapsulate vehicle location information included in the broadcast message. For another example, a speed field is used to carry/encapsulate a vehicle driving speed or the like included in the broadcast message. If the broadcast message (that is, the data packet) needs to carry/include more information, for example, vehicle size information, a message type, or a message identifier, a corresponding related field may be added for encapsulation and transmission.

For example, in one embodiment of this application, a vehicle size field may be added to the broadcast message to encapsulate vehicle size information or vehicle type information of a vehicle on which the vehicle terminal is located or other information used to describe a vehicle size in more details. Vehicle size information of other surrounding vehicles in a coverage area in which the relay terminal is allowed for reception may be directly determined or substantially learned from the added vehicle size field.

For another example, an identification field (for example, occupying 1 bit bit) is added to the broadcast message, to identify whether the broadcast message is an initially-sent message or a forwarded message. During actual application, for example, "0" may be used to identify an initially-sent message, and "1" is used to identify a forwarded message; or "1" is used to identify an initially-sent message, and "0" is used to identify a forwarded message.

Operation S102: Determine a vehicle existing between a vehicle terminal i and a vehicle terminal j based on the vehicle location information in the received broadcast messages, where both the vehicle terminal i and the vehicle terminal j belong to the N vehicle terminals.

In this embodiment of this application, the relay terminal may learn vehicle location information corresponding to the N vehicle terminals, from a location field in the received broadcast messages. Similarly, the relay terminal may learn vehicle size information corresponding to the N vehicle terminals, from a vehicle size field in the received broadcast messages.

In an embodiment of this application, a specific implementation of operation S102 is: The relay terminal may determine the vehicle existing between the vehicle terminal i and the vehicle terminal j based on the vehicle location information corresponding to the N vehicle terminals. In one embodiment, the relay terminal may determine, based on the vehicle location information corresponding to the N vehicle terminals within the Internet of vehicles, the vehicle existing between the vehicle terminal i and the vehicle terminal j on a signal propagation path (that is, a communication link). The signal propagation path includes a signal propagation path used when the vehicle terminal i and the vehicle terminal j communicate with each other within a preset distance range. The signal propagation path includes a rectilinear propagation path or a non-rectilinear propagation path.

In another embodiment of this application, a specific implementation of operation S102 is: If the broadcast message further includes vehicle size information, the relay terminal may further determine, based on the vehicle location information and the vehicle size information in the broadcast message, that a vehicle likely to cause blocking exists between the vehicle terminal i and the vehicle terminal j. Both the vehicle terminal i and the vehicle terminal j belong to the N vehicle terminals.

In one embodiment, the relay terminal may determine, based on the vehicle location information in the received broadcast message, the vehicle existing between vehicle terminal i and the vehicle terminal j on the signal propagation path. In addition, the relay terminal may further determine, based on vehicle size information corresponding to the determined vehicle that a vehicle likely to cause blocking exists between the vehicle terminal i and the vehicle terminal j on the signal propagation path. For example, a vehicle whose vehicle size information (that is, a vehicle size) corresponding to the determined vehicle exceeds a preset vehicle size threshold is considered as a vehicle likely to cause blocking and that exists between the vehicle terminal i and the vehicle terminal j. The preset vehicle size threshold may be an empirical value obtained from statistics on all historical blocking, for example, a height higher than 3.35 meters (m).

In another embodiment of this application, a specific implementation of operation S102 is: The relay terminal may determine obstacles existing between the vehicle terminal i and the vehicle terminal j, based on the vehicle location information corresponding to the N vehicle terminals in combination with map information. The obstacles may include a vehicle and a fixed obstacle. Similarly, during actual application, the relay terminal may determine obstacles existing between the vehicle terminal i and the vehicle terminal j on a signal propagation path. The fixed obstacle herein may be a fixed, immovable, and unchangeable blocking object such as a building, a huge mountain, or a tree, or other predictable and fixed objects that can cause blocking. The map information herein may be an electronic map downloaded in real time or in advance by the relay terminal through a network, to learn geographical environment information or a fixed obstacle between the vehicle terminal i and the vehicle terminal j, for example, a building or a huge mountain presented in a form of a two-dimensional or three-dimensional model.

In another embodiment of this application, a specific implementation of operation S102 is: The relay terminal may determine that obstacles likely to cause blocking exist between the vehicle terminal i and the vehicle terminal j, based on the vehicle location information and the vehicle size information that are corresponding to the N vehicle terminals in combination with map information. In one embodiment, the relay terminal may determine, based on the vehicle location information in the received broadcast message in combination with the map information, the obstacles existing between the vehicle terminal i and the vehicle terminal j on the signal propagation path. In addition, the relay terminal may further determine, based on size information corresponding to the determined obstacles, obstacles likely to cause blocking existing between the vehicle terminal i and the vehicle terminal j on the signal propagation path, where the obstacles include a vehicle and a fixed obstacle. For example, the relay terminal may use both a vehicle whose vehicle size information exceeds a preset vehicle size threshold and that exists between the vehicle terminal i and the vehicle terminal j and a fixed obstacle whose size exceeds a preset obstacle size threshold and that exists between the vehicle terminal i and the vehicle terminal j, as the obstacles likely to cause blocking and that exist between the vehicle terminal i and the vehicle terminal j.

The preset obstacle size threshold and the preset vehicle size threshold each may also be a size, obtained from historical statistics, of a vehicle or a fixed obstacle that causes blocking (communication interruption or communication distance limitation), for example, a height greater than 3.35 meters, or a width greater than 2.5 meters. The preset obstacle size threshold and the preset vehicle size threshold may be a same size threshold, or may be different size thresholds. This is not limited in this embodiment of this application.

Operation S103: Calculate link quality of a communication link $R_{ij}$ based on vehicle size information corresponding to the vehicle, where the $R_{ij}$ is a communication link used when the vehicle terminal i and the vehicle terminal j communicate with each other.

In an embodiment of this application, a specific implementation of operation S103 is: If the obstacle existing between the vehicle terminal i and the vehicle terminal j includes only a vehicle, the relay terminal may calculate the link quality of the communication link $R_{ij}$ based on the vehicle size information corresponding to the determined vehicle. The communication link $R_{ij}$ is a communication link used when the vehicle terminal i and the vehicle terminal j communicate with each other.

In another embodiment of this application, a specific implementation of operation S103 is: If the obstacle existing between the vehicle terminal i and the vehicle terminal j includes a vehicle and a fixed obstacle, the relay terminal may calculate the link quality of the communication link $R_{ij}$ based on the vehicle size information corresponding to the determined vehicle and size information corresponding to the determined fixed obstacle.

Figure 5A:
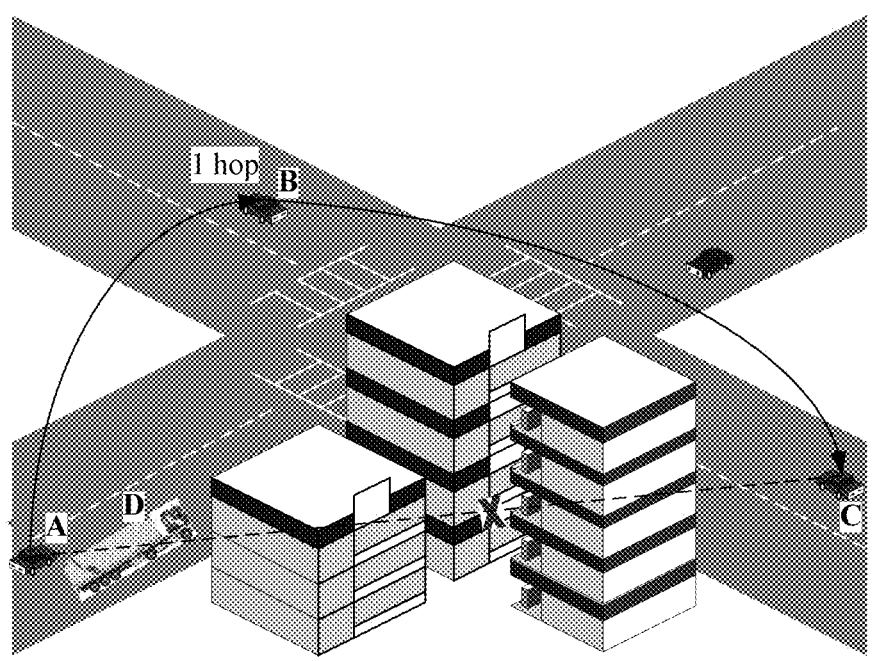
FIG. 5A is a schematic diagram of a scenario according to an embodiment of this application.

During actual application, the relay terminal may use a geometry-based deterministic model, for example, a ray-tracing (ray-tracing) method, to completely rebuild and simulate an actual physical radio frequency propagation process in which message transmission is performed between the vehicle terminal i and the vehicle terminal j. For example, FIG. 5A is a schematic diagram of a scenario. The scenario includes a relay terminal (a vehicle terminal B provided with a relay capability shown in the figure), a vehicle terminal A, a vehicle terminal C, and three fixed buildings. The relay terminal may determine, according to operation S101 and operation S102, that obstacles existing between the vehicle terminal A and the vehicle terminal C on the rectilinear propagation path include a middle-sized bus (the figure shows a vehicle terminal D) and a fixed building, use a three-dimensional ray-tracing method to rebuild and simulate a waveform propagation model, compute, based on a geometrical shape and geometrical vision, a propagation link that may exist between the vehicle terminal A and the vehicle terminal C, and obtain a link impact response containing link information. The figure shows two propagation links (communication links) "A-C" and "A-B and B-C". The link impact response includes information such as a propagation (communications) link and link quality of the communication link.

Operation S104: Determine whether the link quality of the $R_{ij}$ is lower than a preset threshold.

In this embodiment of this application, the relay terminal may determine whether the calculated link quality of the $R_{ij}$ exceeds the preset threshold; and if the link quality of the $R_{ij}$ exceeds the preset threshold, the relay terminal considers that the link quality of the $R_{ij}$ is good enough to support normal message transmission, and the procedure can be ended; or if the link quality of the $R_{ij}$ does not exceed the preset threshold (or is lower than the preset threshold), the relay terminal considers that the link quality of the $R_{ij}$ is not good enough to support normal message transmission, and the relay terminal continues to perform operation S105a and/or operation S105b.

Operation S105a: Determine, from broadcast information sent by the vehicle terminal i, to-be-forwarded broadcast information sent by the vehicle terminal i.

In an embodiment of this application, a specific implementation of operation S105a is: The relay terminal may use all broadcast messages sent by the vehicle terminal i as to-be-forwarded broadcast messages that need to be forwarded, that is, the to-be-forwarded broadcast messages sent by the vehicle terminal i.

In another embodiment of this application, a specific implementation of operation S105a is: If the broadcast message includes a message identifier, the relay terminal may determine whether the message identifier of the broadcast message sent by the vehicle terminal i is an identifier of an initially-sent message; and if the message identifier is an identifier of an initially-sent message, the relay terminal may use the broadcast message sent by the vehicle terminal i as the to-be-forwarded broadcast message sent by the vehicle terminal i; or if the message identifier is not an identifier of an initially-sent message, the relay terminal may discard the broadcast messages sent by the vehicle terminal i. That is, the relay terminal forwards only the initially-sent broadcast message sent by the vehicle terminal i; and if what is sent by the vehicle terminal i is a forwarded broadcast message, the relay terminal directly discards the forwarded broadcast message or performs no processing on the forwarded broadcast message.

It should be understood that the message identifier includes an identifier of an initially-sent message and an identifier of a forwarded message. The identifier of an initially-sent message is used to identify that a corresponding broadcast message is an initially-sent (broadcast) message; similarly, the identifier of a forwarded message is used to identify that a corresponding broadcast message is a forwarded (broadcast) message.

In another embodiment of this application, a specific implementation of operation S105a is: If the broadcast message includes an aging time, where the aging time is used to identify a valid time or a life cycle of the broadcast message, the relay terminal may obtain a transmission time used for sending a broadcast message from sending the broadcast message by the vehicle terminal i to receiving, by the relay terminal, the broadcast message sent by the vehicle terminal i. Then the relay terminal may determine whether the transmission time used for sending the broadcast message sent by the vehicle terminal i is less than or equal to the aging time of the broadcast message sent by the vehicle terminal i. If the transmission time is less than or equal to the aging time, the relay terminal may use the broadcast message sent by the vehicle terminal i as the to-be-forwarded broadcast message sent by the vehicle terminal i. If the transmission time is greater than the aging time, the relay terminal may directly discard or perform no processing on the broadcast message sent by the vehicle terminal i. That is, the relay terminal forwards only a broadcast message that is within a valid acting time (within the aging time); and if the broadcast message exceeds the aging time of the broadcast message, the relay terminal may directly discard or perform no processing on the broadcast message.

In another embodiment of this application, a specific implementation of operation S105a is: If the broadcast message includes a message identifier, when determining that a message of a broadcast message sent by the vehicle terminal i is an identifier of an initially-sent message, that is, when determining that the broadcast message sent by the vehicle terminal i is an initially-sent broadcast message, the relay terminal continues to determine whether the broadcast message sent by the vehicle terminal i has same content as another broadcast message. If the content of the broadcast message sent by the vehicle terminal i is different from that of the another broadcast message, the relay terminal may use the broadcast message sent by the vehicle terminal i as the to-be-forwarded broadcast message sent by the vehicle terminal i. If the content of the broadcast message sent by the vehicle terminal i is the same as that of the another broadcast message, the broadcast message sent by the vehicle terminal i may have been directly broadcast by another corresponding vehicle terminal; in this case, the relay terminal may discard or perform no processing on the broadcast message sent by the vehicle terminal i. The another broadcast message herein is a broadcast message sent to the relay terminal by the rest N−1 vehicle terminals other than the vehicle terminal i.

In another embodiment of this application, a specific implementation of operation S105a is: If the content of the broadcast message sent by the vehicle terminal i is the same as that of another broadcast message, the relay terminal may alternatively use the broadcast message sent by the vehicle terminal i as the to-be-forwarded broadcast message sent by the vehicle terminal i. The another broadcast message herein is a broadcast message sent by the rest N−1 vehicle terminals other than the vehicle terminal i, and a message identifier of the another broadcast message is an identifier of an initially-sent message. That is, the another broadcast message herein is an initially-sent broadcast message sent by the rest N−1 vehicle terminals other than the vehicle terminal i.

It should be understood that when the relay terminal determines that the message identifier of the broadcast message sent by the vehicle terminal i is an identifier of an initially-sent message, the relay terminal continues to determine that the content of the broadcast message sent by the vehicle terminal i is the same as that of the another broadcast message; in this case, the relay terminal may directly discard or perform no processing on the broadcast message sent by the vehicle terminal i. The other broadcast message herein is the broadcast message sent by the N−1 vehicle terminals other than the vehicle terminal i, and the message identifier of the other broadcast message is not an identifier of an initially-sent message (or is an identifier of a forwarded message). That is, the other broadcast message herein is a forwarded broadcast message sent by the rest N−1 vehicle terminals other than the vehicle terminal i.

It should be noted that when determining that a broadcast message sent by the vehicle terminal i is consistent with any one or more of the cases in the foregoing several embodiments, the relay terminal may use the broadcast message sent by the vehicle terminal i as the to-be-forwarded broadcast message that is sent by the vehicle terminal i and that needs to be forwarded.

Operation S106a: Forward, to the vehicle terminal j, the to-be-forwarded broadcast message sent by the vehicle terminal i.

In this embodiment of this application, after determining, from the broadcast message sent by the vehicle terminal i, the to-be-forwarded broadcast message sent by the vehicle terminal i, the relay terminal may forward, to the vehicle terminal j, the to-be-forwarded broadcast message sent by the vehicle terminal i, to implement communication and interworking between the vehicle terminal i and the vehicle terminal j through a relay forwarding function of the relay terminal.

In an embodiment of this application, a specific implementation of operation S106a is: When the relay terminal has a plurality of to-be-forwarded broadcast messages, the relay terminal may forward the plurality of to-be-forwarded broadcast messages to corresponding vehicle terminals according to a conventional transmission mechanism that may certainly include forwarding, to the vehicle terminal j, the to-be-forwarded broadcast message sent by the vehicle terminal i. The transmission mechanism herein may include a first-in-first-out (FIFO) mechanism, a first-in-last-out (FILO) mechanism, a last-in-first-out (LIFO) mechanism, or other mechanisms used for message transmission. This is not limited in this embodiment of this application.

In another embodiment of this application, a specific implementation of operation S106a is: The relay terminal may forward, to the vehicle terminal j based on load information of a network forwarding link, the to-be-forwarded broadcast message sent by the vehicle terminal i. The network forwarding link herein is a communication link $R_{oj}$ used when the relay terminal and the vehicle terminal j communicate with each other.

In one embodiment, when the relay terminal has a plurality of to-be-forwarded broadcast messages that need to be sent to the vehicle terminal j, because the relay terminal needs to forward massive to-be-forwarded broadcast messages, problems such as link congestion or link breakdown may occur without management. Therefore, during actual application, the relay terminal may control, based on load information of the $R_{oj}$, a forwarding frequentness or frequency for the plurality of to-be-forwarded broadcast messages. The plurality of to-be-forwarded broadcast messages herein may be broadcast messages that need to be forwarded by the relay terminal and that are sent by all or some vehicle terminals within the Internet of vehicles, which may certainly include the to-be-forwarded broadcast message sent by the vehicle terminal j.

For example, if load of the $R_{oj}$ is relatively high (exceeding a preset load threshold), it indicates that the link $R_{oj}$ has a few available resources (for example, available bandwidths); in this case, the relay terminal may control a forwarding frequency/frequentness of the plurality of to-be-forwarded messages to decrease, or control a forwarding frequency/frequentness of forwarding the plurality of to-be-forwarded messages by the relay terminal to be a first frequency/frequentness. For example, originally forwarding five to-be-forwarded broadcast messages each time to forwarding two to-be-forwarded broadcast messages each time. If load of the $R_{oj}$ is relatively low (without exceeding a preset load threshold), it indicates that the link $R_{oj}$ has many available resources (for example, available bandwidths); in this case, the relay terminal may control a forwarding frequency/frequentness of the plurality of to-be-forwarded messages to increase, or control a frequency/frequentness of forwarding the plurality of to-be-forwarded messages by the relay terminal to be a second frequency/frequentness. The first frequency/frequentness is less than the second frequency/frequentness.

In another embodiment of this application, a specific implementation of operation S106a is: If the broadcast message includes a message property, when the relay terminal has a plurality of to-be-forwarded broadcast messages to be sent to the vehicle terminal j, the relay terminal may configure corresponding priorities for the plurality of to-be-forwarded broadcast messages, that is, determine the priorities of the plurality of to-be-forwarded broadcast messages, based on message properties of the plurality of to-be-forwarded broadcast messages. Then the relay terminal may forward the plurality of to-be-forwarded broadcast messages to the vehicle terminal j based on the load information of the $R_{oj}$ and the priorities of the plurality of to-be-forwarded broadcast messages. The message property herein may include one or a combination of more of the following: an importance level, an emergency level, an aging time, whether the message property is a safe-class message, a message size, and other property information used to describe the broadcast message.

In one embodiment, when the relay terminal has a plurality of to-be-forwarded broadcast messages that need to be sent to the vehicle terminal j, the relay terminal may allocate or configure corresponding priorities for the plurality of to-be-forwarded broadcast messages based on message properties of the plurality of to-be-forwarded broadcast messages such as an importance level, an emergency level, and an aging time.

For example, the relay terminal configures a first priority for some to-be-forwarded broadcast messages with a higher importance level, a higher emergency level, or a shorter aging time; and similarly, configures a second priority for some to-be-forwarded broadcast messages with a lower importance level, a lower emergency level, or a longer aging time. The first priority is higher than the second priority. Correspondingly, the relay terminal may preferentially forward, based on the forwarding frequency or forwarding frequentness corresponding to the load information of the $R_{oj}$, the to-be-forwarded broadcast messages corresponding to the first priority before the to-be-forwarded broadcast messages corresponding to the second priority.

In another embodiment of this application, a specific implementation of operation S106a is: If the broadcast message includes a message property, when the relay terminal has a plurality of to-be-forwarded broadcast messages, the relay terminal may configure corresponding priorities for the plurality of to-be-forwarded broadcast messages based on message properties of the plurality of to-be-forwarded broadcast messages. The plurality of to-be-forwarded broadcast messages herein may be broadcast messages forwarded by the relay terminal to any one or more of the N vehicle terminals within the Internet of vehicles, which may certainly include the to-be-forwarded broadcast message forwarded to the vehicle terminal j. Then the relay terminal may obtain load information of a communication link $R_{ox}$ used when the relay terminal and a target vehicle terminal communicate with each other, and set a rule for or perform algorithmic operation processing on the load information of the $R_{ox}$ and a priority of a target to-be-forwarded broadcast message that needs to be forwarded to a target vehicle terminal corresponding to the $R_{ox}$, for example, setting a proportional algorithm, to calculate a corresponding comprehensive forwarding order. Further, the relay terminal may forward the target to-be-forwarded broadcast message to the target vehicle terminal in the comprehensive forwarding order. The target to-be-forwarded broadcast message herein belongs to a plurality of to-be-forwarded broadcast messages. The target vehicle terminal herein belongs to the N vehicle terminals within the Internet of vehicles. In addition, x may be any one of 1, 2, . . . , i, j, k, . . . , and N, that is, any one of the N vehicle terminals within the Internet of vehicles.

Figure 5B:
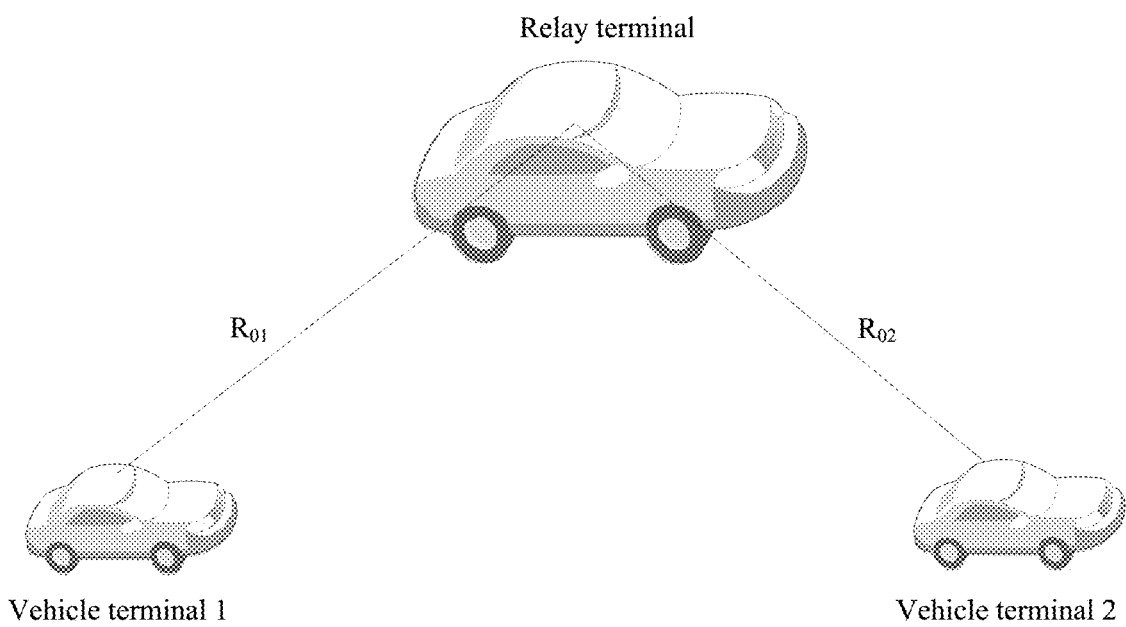
FIG. 5B is a schematic diagram of another scenario according to an embodiment of this application.

For example, FIG. 5B is a schematic diagram of a scenario. The schematic diagram of the scenario includes a relay terminal and two vehicle terminals (a vehicle terminal 1 and a vehicle terminal 2). The relay terminal needs to send three to-be-forwarded broadcast messages: a message 1, a message 2, and a message 3 to the vehicle terminal 1; and needs to send two to-be-forwarded broadcast messages: a message 4 and a message 5 to the vehicle terminal 2. The message 2 and the message 5 have a same priority, and a priority of the message 1 (PR1=5)>a priority of the message 2 (PR2=4)>a priority of the message 5 (PR5=3). In addition, load of a communication link $R_{o1}$ used when the relay terminal and the vehicle terminal 1 communicate with each other is 6, and load of a communication link $R_{o2}$ used when the relay terminal and the vehicle terminal 2 communicate with each other is 3. In this case, the relay terminal may calculate forwarding scores of the $R_{o1}$ and $R_{o2}$ based on a specified proportional algorithm. For example, a forwarding score of the $R_{o1}$ is 6×0.6+(PR1+PR2+PR3)×0.4=6×0.6+(5+4+3)×0.4=8.4; similarly, a forwarding score of the $R_{o2}$ is 3×0.6+(PR4+PR5)×0.4=3×0.6+(2+4)×0.4=4.2. Because 8.4>4.2, the relay terminal may first forward the to-be-forwarded messages 1, 2, and 3 to the vehicle terminal 1, and then forward the to-be-forwarded messages 4 and 5 to the vehicle terminal 2, until all messages are forwarded.

In another embodiment of this application, when the relay terminal determines that the link quality of the $R_{ij}$ is lower than the preset threshold in operation S104, operations S105b and S106b may be further performed. For details, refer to a schematic flowchart of another relay transmission method shown in FIG. 4B.

Operation S105b: Determine, from broadcast information sent by the vehicle terminal j, to-be-forwarded broadcast information sent by the vehicle terminal j.

Operation S106b: Forward, to the vehicle terminal i, the to-be-forwarded broadcast message sent by the vehicle terminal j.

It should be understood that for details of operations S105b and S106b herein, reference may be made to related descriptions of operations S105a and S106a, and no details are repeated herein.

Figure 4B:
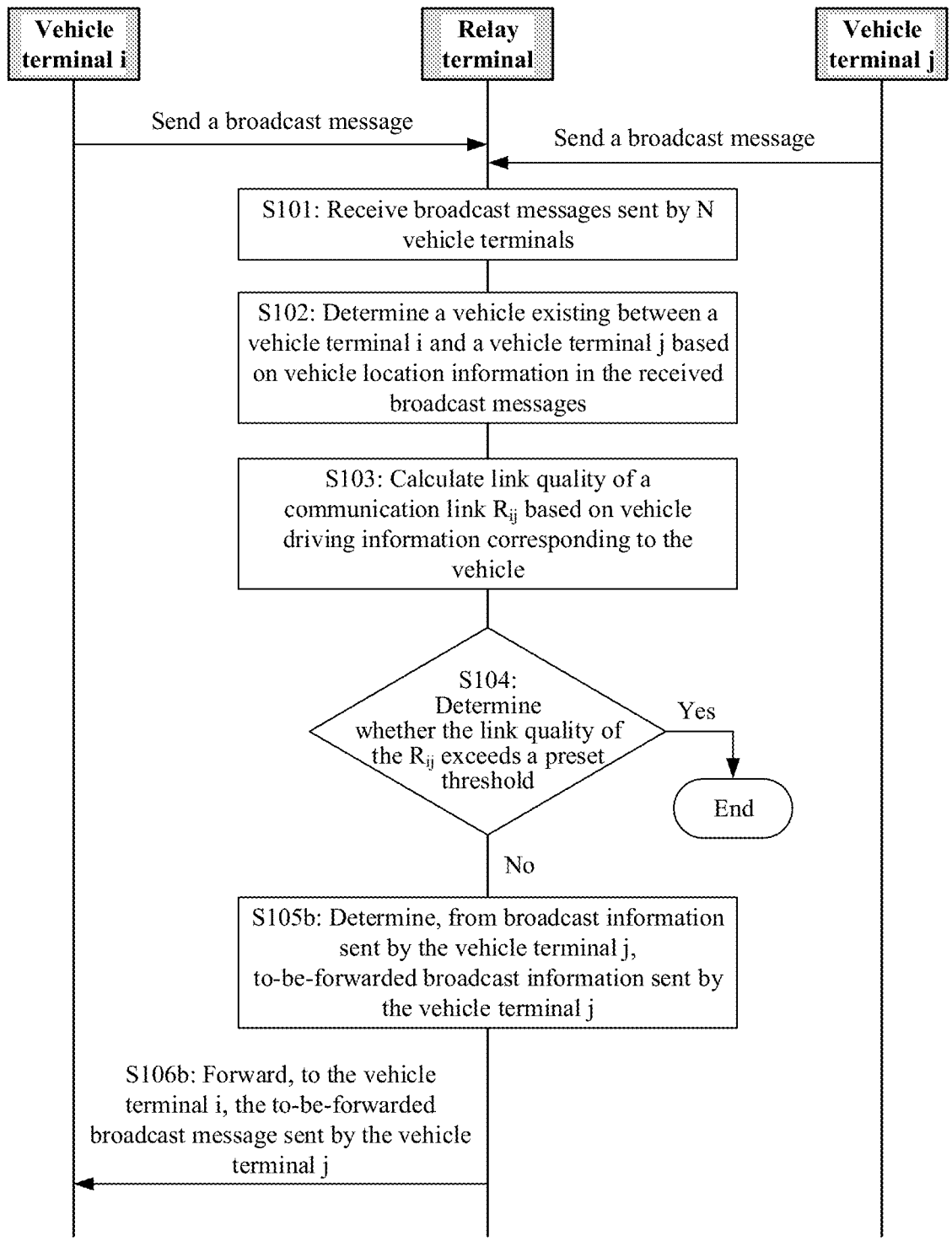
FIG. 4B is a schematic flowchart of another relay transmission method according to an embodiment of this application.
Figure 4C:
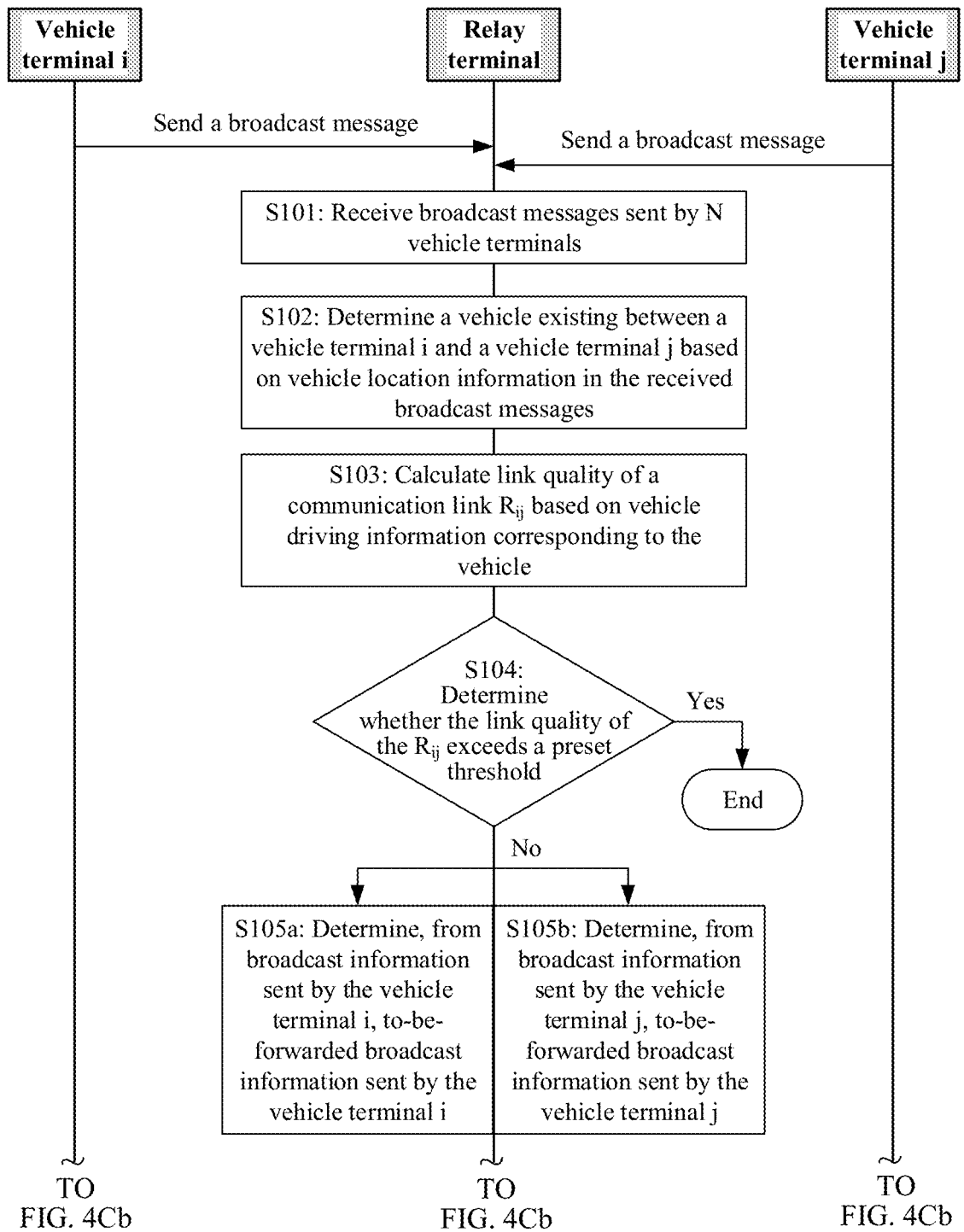
FIG. 4Ca and FIG. 4Cb are a schematic flowchart of another relay transmission method according to an embodiment of this application.
Figure 4C:
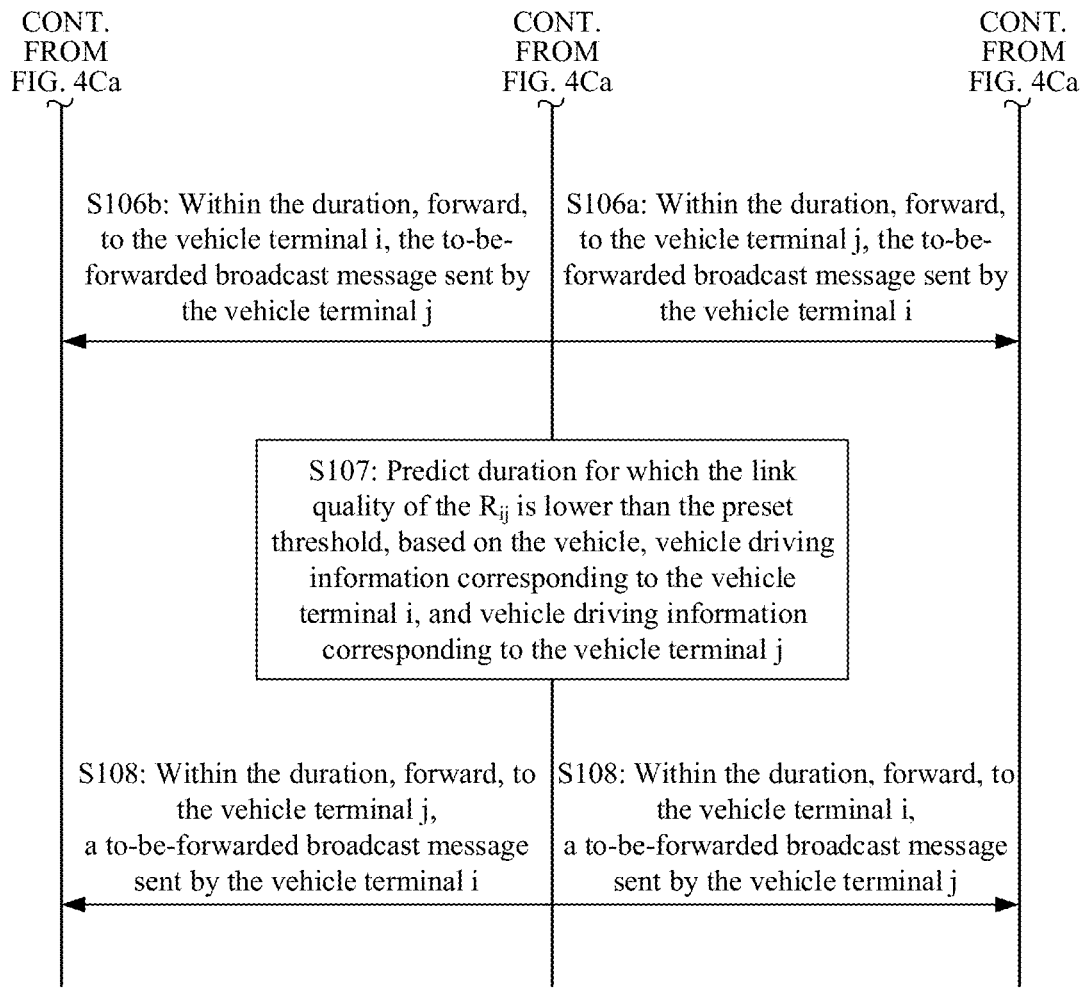

In another embodiment of this application, when the relay terminal determines that the link quality of the $R_{ij}$ is lower than the preset threshold, FIG. 4Ca and FIG. 4Cb are another schematic flowchart of relay transmission according to an embodiment of this application. After operation S104 in FIG. 4A, the procedure further includes operations S107 and S108.

Operation S107. Predict duration for which the link quality of the $R_{ij}$ is lower than the preset threshold, based on the vehicle, vehicle driving information corresponding to the vehicle terminal i, and vehicle driving information corresponding to the vehicle terminal j, where the vehicle driving information includes vehicle driving speed information and vehicle driving direction information.

In this embodiment of this application, in some special road segments in which overtaking is disallowed, the relay terminal may calculate and predict the duration for which the link quality of the $R_{ij}$ is lower than the preset threshold, based on the determined vehicle existing between the vehicle terminal i and the vehicle terminal j and vehicle driving information corresponding to vehicles on which the vehicle terminal i and the vehicle terminal j are located.

Specifically, the relay terminal may calculate and predict duration for which the link quality of the $R_{ij}$ used when the vehicle terminal i and the vehicle terminal j communicate with each other is poor, based on the vehicle, the vehicle driving information corresponding to the vehicle terminal i, and the vehicle driving information corresponding to the vehicle terminal j in combination with map information (path information) downloaded on line or offline. The special road segment herein may be a road segment such as a one-way street, a curve, a slope, a tunnel, or a road segment with a relatively large traffic flow in an urban area. Alternatively, the relay terminal may perform related prediction on the duration for which the link quality of the $R_{ij}$ is lower than the preset threshold, in situations, for example, when a vehicle driving speed of the vehicle between the vehicle terminal i and the vehicle terminal j is excessively high (exceeding a preset speed threshold).

The vehicle driving information herein may include information such as a vehicle driving speed, a vehicle driving direction, and a vehicle driving acceleration.

Operation S108. Within the duration, forward, to the vehicle terminal j, a to-be-forwarded broadcast message sent by the vehicle terminal i, and forward, to the vehicle terminal i, a to-be-forwarded broadcast message sent by the vehicle terminal j.

In one embodiment, when predicting the duration for which the link quality of the $R_{ij}$ is lower than the preset threshold, the relay terminal may directly forward, to the vehicle terminal j, the to-be-forwarded broadcast message that is sent by the vehicle terminal i and that is received within the duration, and directly forward, to the vehicle terminal i, the to-be-forwarded broadcast message that is sent by the vehicle terminal j and that is received within the duration, to reduce calculation load of the relay terminal.

Practicing this embodiment of this application can avoid communication interruption or communication distance limitation caused by blocking due to unpredictable factors such as a large vehicle within the Internet of vehicles, thereby improving reliability of message transmission within the Internet of vehicles.

Figure 6A:
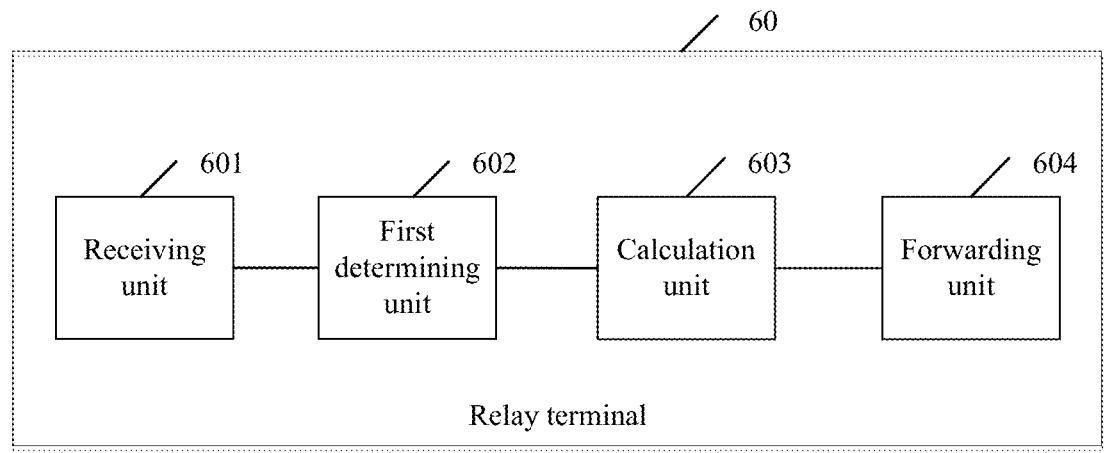
FIG. 6A is a schematic structural diagram of a relay terminal according to an embodiment of this application.

FIG. 6A is a schematic structural diagram of a relay terminal 60 according to an embodiment of this application. The relay terminal (which may be an Internet device having a communication function such as a mobile phone or a personal computer) 60 includes a receiving unit 601, a first determining unit 602, a calculation unit 603, and a forwarding unit 604.

The receiving unit 601 is configured to receive broadcast messages sent by N vehicle terminals, where the broadcast message includes vehicle location information, and N is a positive integer greater than 1.

The first determining unit 602 is configured to determine, based on the vehicle location information in the received broadcast messages, a vehicle existing between a vehicle terminal i of the N vehicle terminals and a vehicle terminal j of the N vehicle terminals.

The calculation unit 603 is configured to calculate link quality of a communication link $R_{ij}$ based on vehicle size information corresponding to the vehicle, where the $R_{ij}$ is a communication link used when the vehicle terminal i and the vehicle terminal j communicate with each other.

The forwarding unit 604 is configured to: if the link quality of the $R_{ij}$ is lower than a preset threshold, forward, to the vehicle terminal j, a to-be-forwarded broadcast message sent by the vehicle terminal i, and forward, to the vehicle terminal i, a to-be-forwarded broadcast message sent by the vehicle terminal j.

In one embodiment, the relay terminal further includes a sending unit and an enabling unit. The sending unit is configured to send a relay capability indication message to a base station. The relay capability indication message is used to indicate a relay capability and/or a relay location of the relay terminal. The receiving unit is further configured to receive relay configuration information sent by the base station. The relay configuration information is used to instruct to enable a relay function of the relay terminal. The enabling unit is configured to enable the relay function of the relay terminal as instructed by the relay configuration information.

In one embodiment, the first determining unit is specifically configured to determine, based on the vehicle location information in the received broadcast messages in combination with map information, obstacles existing between the vehicle terminal i of the N vehicle terminals and the vehicle terminal j of the N vehicle terminals, where the obstacles include the vehicle and a fixed obstacle. The calculation unit is specifically configured to calculate the link quality of the communication link $R_{ij}$ based on the vehicle size information corresponding to the vehicle and size information corresponding to the fixed obstacle.

The communication link $R_{ij}$ is a communication link used when the vehicle terminal i and the vehicle terminal j communicate with each other.

In one embodiment, when the link quality of the $R_{ij}$ is lower than the preset threshold, the relay terminal further includes a prediction unit. The prediction unit is configured to predict duration for which the link quality of the $R_{ij}$ is lower than the preset threshold, based on the vehicle, vehicle driving information corresponding to the vehicle terminal i, and vehicle driving information corresponding to the vehicle terminal j. The vehicle driving information includes vehicle driving speed information and vehicle driving direction information. The forwarding unit is further configured to: within the duration, forward, to the vehicle terminal j, the to-be-forwarded broadcast message sent by the vehicle terminal i, and forward, to the vehicle terminal i, the to-be-forwarded broadcast message sent by the vehicle terminal j.

In one embodiment, the broadcast message includes a message identifier, and the relay terminal further includes a second determining unit. The second determining unit is configured to: when it is determined that a message identifier of a broadcast message sent by the vehicle terminal i is an identifier of an initially-sent message, determine the broadcast message sent by the vehicle terminal i as the to-be-forwarded broadcast message sent by the vehicle terminal i.

In one embodiment, the broadcast message includes an aging time, and the relay terminal further includes a second determining unit. The second determining unit is configured to: when it is determined that a transmission time of broadcast information sent by the vehicle terminal i is within an aging time of the broadcast message, determine the broadcast message sent by the vehicle terminal i as the to-be-forwarded broadcast message sent by the vehicle terminal i.

In one embodiment, the broadcast message includes an aging time, and when the link quality of the $R_{ij}$ is lower than the preset threshold, the relay terminal further includes a first discarding unit, configured to: when it is determined that a transmission time of broadcast information sent by the vehicle terminal i exceeds an aging time of the broadcast message, discard the broadcast information sent by the vehicle terminal i.

In one embodiment, the broadcast message includes a message identifier, and the relay terminal further includes a second determining unit. The second determining unit is configured to: when it is determined that a message identifier of a broadcast message sent by the vehicle terminal i is an identifier of an initially-sent message, and that content of the broadcast message sent by the vehicle terminal i is different from that of another broadcast message, determine the broadcast message sent by the vehicle terminal i as the to-be-forwarded broadcast message sent by the vehicle terminal i. The another broadcast message is a broadcast message sent by a vehicle terminal other than the vehicle terminal i.

In one embodiment, the broadcast message includes a message identifier, and the relay terminal further includes a second discarding unit. The second discarding unit is configured to: when it is determined that a message identifier of a broadcast message sent by the vehicle terminal i is an identifier of an initially-sent message, and that content of the broadcast message sent by the vehicle terminal i is the same as that of another broadcast message, discard the broadcast message sent by the vehicle terminal i.

The another broadcast message is a broadcast message sent by a vehicle terminal other than the vehicle terminal i, and a message identifier of the another broadcast message is not an identifier of an initially-sent message.

In one embodiment, the broadcast message includes a message identifier, and the relay terminal further includes a second determining unit. The second determining unit is configured to: when it is determined that a message identifier of a broadcast message sent by the vehicle terminal i is an identifier of an initially-sent message, and that content of the broadcast message sent by the vehicle terminal i is the same as that of another broadcast message, determine the broadcast message sent by the vehicle terminal i as the to-be-forwarded broadcast message sent by the vehicle terminal i.

The other broadcast message is a broadcast message sent by a vehicle terminal other than the vehicle terminal i, and a message identifier of the another broadcast message is an identifier of an initially-sent message.

In one embodiment, the forwarding unit is specifically configured to: based on load information of a network forwarding link, determine a forwarding frequentness, and forward, to the vehicle terminal j, the to-be-forwarded broadcast message sent by the vehicle terminal i.

The network forwarding link is a communication link used when the relay terminal and the vehicle terminal j communicate with each other.

In one embodiment, the broadcast message includes a message property, and when the relay terminal has a plurality of to-be-forwarded broadcast messages to be sent to the vehicle terminal j, the relay terminal further includes a third determining unit. The third determining unit is configured to determine priorities of the plurality of to-be-forwarded broadcast messages based on message properties of the plurality of to-be-forwarded broadcast messages.

The forwarding unit is further specifically configured to: based on load information of a network forwarding link, determine a forwarding frequentness, and forward the plurality of to-be-forwarded broadcast messages to the vehicle terminal j according to the priorities of the plurality of to-be-forwarded broadcast messages.

The network forwarding link is a communication link used when the relay terminal and the vehicle terminal j communicate with each other.

It should be noted that for specific implementation of the relay terminal shown in FIG. 6, reference may be made to corresponding descriptions of the method embodiments shown in FIG. 4A to FIG. 4Cb, and no details are repeated herein.

By running the units, the relay terminal determines, based on the vehicle location information in the received broadcast messages sent by the N vehicle terminals, the vehicle existing between the vehicle terminal i and the vehicle terminal j; and when it is obtained through calculation that the link quality of the communication link $R_{ij}$ used when the vehicle terminal i and the vehicle terminal j communicate with each other is lower than the preset threshold, forward, to the vehicle terminal j, the to-be-forwarded broadcast message sent by the vehicle terminal i, and forward, to the vehicle terminal i, the to-be-forwarded broadcast message sent by the vehicle terminal j. A relay forwarding function of the relay terminal avoids communication interruption or communication distance limitation caused by blocking due to unpredictable factors such as a large vehicle within the Internet of vehicles, thereby improving reliability of message transmission within the Internet of vehicles.

Figure 6B:
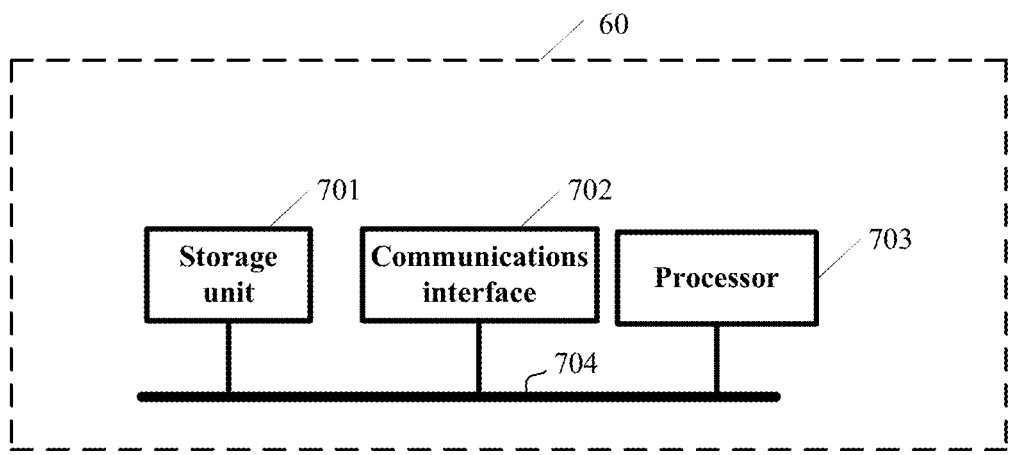
FIG. 6B is a schematic structural diagram of another relay terminal according to an embodiment of this application.

FIG. 6B is a schematic structural diagram of another relay terminal according to an embodiment of this application. The relay terminal (which may be an Internet device having a communication function such as a mobile phone or a personal computer) 60 includes a storage unit 701, a communications interface 702, and a processor 703 coupled to the storage unit 701 and the communications interface 702. The storage unit 701 is configured to store an instruction, the processor 703 is configured to execute the instruction, and the communications interface 702 is configured to communicate with another device under control of the processor 703. In some embodiments of this application, the storage unit 701, the communications interface 702, and the processor 703 may be connected by using a bus or in another manner. Connection performed by using a bus 704 is used as an example in FIG. 7.

The processor 703 invokes a relay transmission program instruction in the storage unit 701, to perform the following operations:

receiving broadcast messages sent by N vehicle terminals, where the broadcast message includes vehicle location information, and the N vehicle terminals form the Internet of vehicles;

determining a vehicle existing between a vehicle terminal i and a vehicle terminal j based on the vehicle location information in the received broadcast messages, where both the vehicle terminal i and the vehicle terminal j belong to the N vehicle terminals;

calculating link quality of a communication link $R_{ij}$ based on vehicle size information corresponding to the vehicle, where the $R_{ij}$ is a communication link used when the vehicle terminal i and the vehicle terminal j communicate with each other; and if the link quality of the $R_{ij}$ is lower than a preset threshold, forwarding, to the vehicle terminal j, a to-be-forwarded broadcast message sent by the vehicle terminal i, and forwarding, to the vehicle terminal i, a to-be-forwarded broadcast message sent by the vehicle terminal j.

In one embodiment, before the receiving, by a relay terminal, broadcast messages sent by N vehicle terminals, the processor 703 is further configured to perform the following operations:

sending a relay capability indication message to a base station, where the relay capability indication message is used to indicate a relay capability and/or a relay location of the relay terminal;

receiving relay configuration information sent by the base station, where the relay configuration information is used to instruct to enable a relay function of the relay terminal; and enabling the relay function of the relay terminal as instructed by the relay configuration information.

In one embodiment, the processor 703 is configured to:

determine, based on the vehicle location information in the received broadcast messages in combination with map information, obstacles existing between the vehicle terminal i and the vehicle terminal j, where the obstacles include the vehicle and a fixed obstacle; and calculate the link quality of the communication link $R_{ij}$ based on the vehicle size information corresponding to the vehicle and size information corresponding to the fixed obstacle.

The communication link $R_{ij}$ is a communication link used when the vehicle terminal i and the vehicle terminal j communicate with each other, and both the vehicle terminal i and the vehicle terminal j belong to the N vehicle terminals.

In one embodiment, when the link quality of the $R_{ij}$ is lower than the preset threshold, the processor 703 is further configured to perform the following operations:

predicting duration for which the link quality of the $R_{ij}$ is lower than the preset threshold, based on the vehicle, vehicle driving information corresponding to the vehicle terminal i, and vehicle driving information corresponding to the vehicle terminal j; and within the duration, forwarding, to the vehicle terminal j, the to-be-forwarded broadcast message sent by the vehicle terminal i, and forwarding, to the vehicle terminal i, the to-be-forwarded broadcast message sent by the vehicle terminal j.

The vehicle driving information includes vehicle driving speed information and vehicle driving direction information.

In one embodiment, the broadcast message includes a message identifier, and before the forwarding, to the vehicle terminal j, the to-be-forwarded broadcast message sent by the vehicle terminal i, the processor 703 is further configured to perform the following operation:

when it is determined that a message identifier of a broadcast message sent by the vehicle terminal i is an identifier of an initially-sent message, determining the broadcast message sent by the vehicle terminal i as the to-be-forwarded broadcast message sent by the vehicle terminal i.

In one embodiment, the broadcast message includes an aging time, and before the forwarding, to the vehicle terminal j, the to-be-forwarded broadcast message sent by the vehicle terminal i, the processor 703 is further configured to perform the following operation:

when it is determined that a transmission time of broadcast information sent by the vehicle terminal i is within an aging time of the broadcast message, determining the broadcast message sent by the vehicle terminal i as the to-be-forwarded broadcast message sent by the vehicle terminal i.

In one embodiment, the broadcast message includes a message identifier, and before the forwarding, to the vehicle terminal j, the to-be-forwarded broadcast message sent by the vehicle terminal i, the processor 703 is further configured to perform the following operation:

when it is determined that a message identifier of a broadcast message sent by the vehicle terminal i is an identifier of an initially-sent message, and that content of the broadcast message sent by the vehicle terminal i is different from that of another broadcast message, determining the broadcast message sent by the vehicle terminal i as the to-be-forwarded broadcast message sent by the vehicle terminal i, where the another broadcast message is a broadcast message sent by a vehicle terminal other than the vehicle terminal i.

In one embodiment, the broadcast message includes a message identifier, and before the forwarding, to the vehicle terminal j, the to-be-forwarded broadcast message sent by the vehicle terminal i, the processor 703 is further configured to perform the following operation:

when it is determined that a message identifier of a broadcast message sent by the vehicle terminal i is an identifier of an initially-sent message, and that content of the broadcast message sent by the vehicle terminal i is the same as that of another broadcast message, determining the broadcast message sent by the vehicle terminal i as the to-be-forwarded broadcast message sent by the vehicle terminal i.

The the broadcast message is a broadcast message sent by a vehicle terminal other than the vehicle terminal i, and a message identifier of the another broadcast message is an identifier of an initially-sent message.

In one embodiment, the processor 703 is configured to:

forward, to the vehicle terminal j based on load information of a network forwarding link, the to-be-forwarded broadcast message sent by the vehicle terminal i.

The network forwarding link is a communication link used when the relay terminal and the vehicle terminal j communicate with each other.

In one embodiment, the broadcast message includes a message property, and when the relay terminal has a plurality of to-be-forwarded broadcast messages to be sent to the vehicle terminal j, the processor 703 is further configured to perform the following operations:

determining priorities of the plurality of to-be-forwarded broadcast messages based on message properties of the plurality of to-be-forwarded broadcast messages; and forwarding the plurality of to-be-forwarded broadcast messages to the vehicle terminal j based on load information of a network forwarding link and the priorities of the plurality of to-be-forwarded broadcast messages.

The network forwarding link is a communication link used when the relay terminal and the vehicle terminal j communicate with each other.

In one embodiment, the broadcast message includes a message identifier, and when the link quality of the $R_{ij}$ is lower than the preset threshold, the processor 703 is further configured to perform the following operation:

when it is determined that a message identifier of a broadcast message sent by the vehicle terminal i is an identifier of an initially-sent message, and that content of the broadcast message sent by the vehicle terminal i is the same as that of another broadcast message, discarding the broadcast message sent by the vehicle terminal i.

The other broadcast message is a broadcast message sent by a vehicle terminal other than the vehicle terminal i, and a message identifier of the another broadcast message is not an identifier of an initially-sent message.

In one embodiment, the broadcast message includes an aging time, and when the link quality of the $R_{ij}$ is lower than the preset threshold, the processor 703 is further configured to perform the following operation:

when it is determined that a transmission time of broadcast information sent by the vehicle terminal i exceeds an aging time of the broadcast message, discarding the broadcast information sent by the vehicle terminal i.

In one embodiment, before the receiving, by a relay terminal, broadcast messages sent by N vehicle terminals, the processor 703 is further configured to perform the following operations:

sending a relay capability indication message to a base station, where the relay capability indication message is used to indicate a relay capability and/or a relay location of the relay terminal;

receiving relay configuration information sent by the network side, where the relay configuration information is used to instruct to enable a relay function of the relay terminal; and enabling the relay capability of the relay terminal as instructed by the relay configuration information, to continue to perform the step of receiving, by the relay terminal, the broadcast messages sent by the N vehicle terminals.

It should be noted that for specific implementation of the relay terminals shown in FIG. 6A and FIG. 6B, reference may be made to corresponding descriptions of the method embodiments shown in FIG. 4A to FIG. 4Cb, and no details are repeated herein.

Figure 7A:
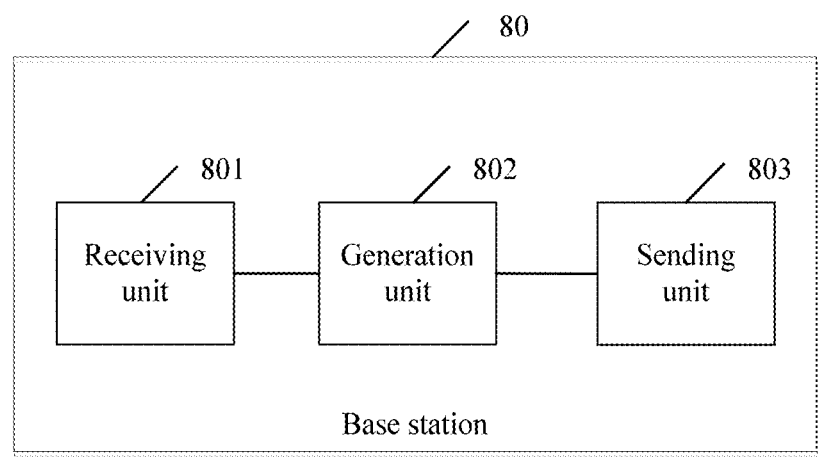
FIG. 7A is a schematic structural diagram of a base station according to an embodiment of this application.

FIG. 7A is a schematic structural diagram of a base station 80 according to an embodiment of this application. The base station 80 includes a receiving unit 801, a generation unit 802, and a sending unit 803.

The receiving unit 801 is configured to receive relay capability indication messages sent by M relay terminals. The relay capability indication message is used to indicate a relay capability and/or a relay location of the relay terminal, and M is a positive integer greater than 0.

The generation unit 802 is configured to generate corresponding relay configuration information for the M relay terminals based on relay capabilities and/or relay locations in the received relay capability indication messages. The relay configuration information is used to instruct to enable or disable a relay function of the relay terminal.

The sending unit 803 is configured to send the generated relay configuration information to the M relay terminals, to control enabling or disabling of relay functions of the M relay terminals.

In one embodiment, the receiving unit is further configured to receive broadcast messages sent by N vehicle terminals, where the broadcast message includes vehicle location information, and N is a positive integer greater than 1. The generation unit is specifically configured to generate corresponding relay configuration information for the M relay terminals based on the relay capabilities and/or the relay locations in the received relay capability indication messages and the vehicle location information in the received broadcast messages.

In one embodiment, the M relay capability indication messages received by the receiving unit include at least two levels of relay capabilities; relay configuration information that is generated by the generation unit and that is corresponding to a relay terminal with a higher-level relay capability is used to instruct to preferentially enable a relay function of the relay terminal with the higher-level relay capability.

Figure 7B:
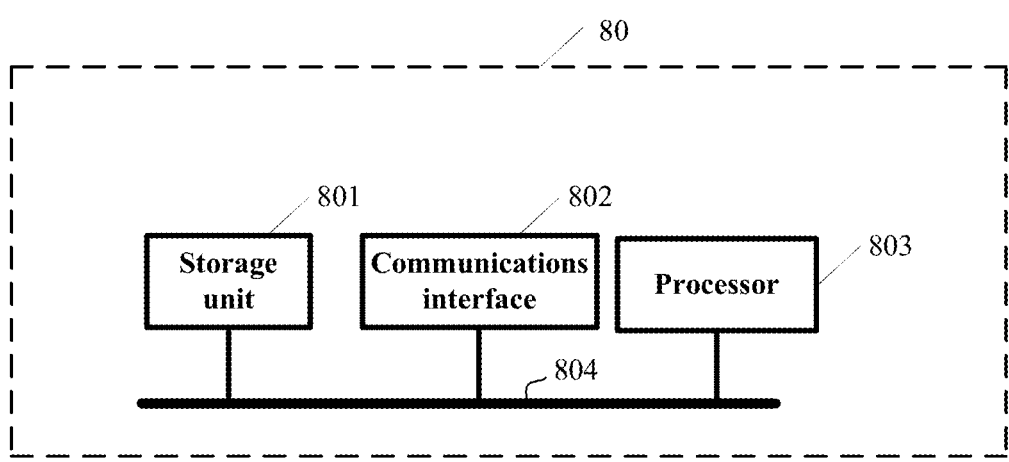
FIG. 7B is a schematic structural diagram of another base station according to an embodiment of this application.

FIG. 7B is a schematic structural diagram of another base station according to an embodiment of this application. The base station 80 includes a storage unit 901, a communications interface 902, and a processor 903 coupled to the storage unit 901 and the communications interface 902. The storage unit 901 is configured to store an instruction, the processor 903 is configured to execute the instruction, and the communications interface 902 is configured to communicate with another device under control of the processor 903. In some embodiments of this application, the storage unit 901, the communications interface 902, and the processor 903 may be connected by using a bus or in another manner. Connection performed by using a bus 904 is used as an example in FIG. 9. The processor 903 invokes a relay transmission program instruction in the storage unit 901, to perform the following operations:

receiving relay capability indication messages sent by M relay terminals, where the relay capability indication message is used to indicate a relay capability and/or a relay location of the relay terminal, and M is a positive integer greater than 0;

generating corresponding relay configuration information for the M relay terminals based on relay capabilities and/or relay locations in the received relay capability indication messages, where the relay configuration information is used to instruct to enable or disable a relay function of the relay terminal; and sending the generated relay configuration information to the M relay terminals, to control enabling or disabling of relay functions of the M relay terminals.

In one embodiment, before the generating corresponding relay configuration information for the M relay terminals, the processor 903 is further configured to perform the following operations:

receiving broadcast messages sent by N vehicle terminals, where the broadcast message includes vehicle location information, and N is a positive integer greater than 1;

the generating corresponding relay configuration information for the M relay terminals based on relay capabilities and/or relay locations in the received relay capability indication messages specifically includes:

generating the corresponding relay configuration information for the M relay terminals based on the relay capabilities and/or the relay locations in the received relay capability indication messages and the vehicle location information in the received broadcast messages.

In one embodiment, the M relay capability indication messages received include at least two levels of relay capabilities, and relay configuration information corresponding to a relay terminal with a higher-level relay capability is used to instruct to preferentially enable a relay function.

It should be noted that for specific implementation of the base stations shown in FIG. 7A and FIG. 7B, reference may be made to corresponding descriptions of the method embodiments shown in FIG. 2A to FIG. 2C, and no details are repeated herein.

In conclusion, practicing the embodiments of this application can avoid communication interruption or communication distance limitation caused by blocking due to unpredictable factors such as a large vehicle within the Internet of vehicles, thereby improving reliability of message transmission within the Internet of vehicles.

A person of ordinary skill in the art may understand that all or some of the processes of the methods in the embodiments may be implemented by a computer program instructing relevant hardware. The program may be stored in a computer readable storage medium. When the program runs, the processes of the method embodiments are performed. The storage medium includes any medium that can store program code such as a ROM, a RAM, a magnetic disk, or an optical disc.

What are disclosed in the foregoing embodiments are merely examples of the embodiments of this application, but are not intended to limit the protection scope of this application. A person of ordinary skill in the art can understand that all or some of the processes of the embodiments may be implemented, and equivalent variations made in accordance with the claims of this application shall fall within the scope of the present invention.

What is claimed is:

1. A relay transmission method, comprising:
receiving, by a relay terminal, broadcast messages having vehicle location information from N vehicle terminals, wherein N is an integer greater than 1;
determining, based on the vehicle location information, a vehicle located between a vehicle terminal i and a vehicle terminal j of the N vehicle terminals;
calculating link quality of a communication link $R_{ij}$ based on vehicle size information corresponding to the vehicle, wherein the $R_{ij}$ is a communication link used when the vehicle terminal i and the vehicle terminal j communicate with each other;
if the link quality of the $R_{ij}$ is lower than a preset threshold of a broadcast message sent by the vehicle terminal i to the vehicle terminal j, predicting a duration for which the link quality of the $R_{ij}$ is lower than the present threshold, based on the vehicle, vehicle driving information corresponding to the vehicle terminal i, and vehicle driving information corresponding to the vehicle terminal j; and
within the duration, forwarding the broadcast message sent by the vehicle terminal i to the vehicle terminal j, and forwarding the broadcast message sent by the vehicle terminal j to the vehicle terminal i, wherein the vehicle driving information comprises vehicle driving speed information and vehicle driving direction information.

2. The method according to claim 1, wherein before receiving broadcast messages sent by N vehicle terminals, the method further comprises:
sending, by the relay terminal, a relay capability indication message to a base station, wherein the relay capability indication message is used to indicate a relay capability and/or a relay location of the relay terminal;

receiving relay configuration information from the base station, wherein the relay configuration information is used to instruct to enable a relay function of the relay terminal; and enabling the relay function of the relay terminal as instructed by the relay configuration information.

3. The method according to claim 1, wherein the determining a vehicle located between a vehicle terminal i of the N vehicle terminals and a vehicle terminal j of the N vehicle terminals comprises:

determining, based on the vehicle location information in combination with map information, obstacles located between the vehicle terminal i and the vehicle terminal j, wherein the obstacles comprise the vehicle and a fixed obstacle, and wherein the calculating link quality of a communication link $R_{ij}$ based on vehicle size information corresponding to the vehicle comprises:

calculating the link quality of the communication link $R_{ij}$ based on the vehicle size information corresponding to the vehicle and size information corresponding to the fixed obstacle.

4. The method according to claim 1, wherein the broadcast message sent by the vehicle terminal i is forwarded to the vehicle terminal j, in response to determining that a message identifier of the broadcast message is identical to an identifier of an initially-sent message.

5. The method according to claim 1, wherein the broadcast message sent by the vehicle terminal i is forwarded to the vehicle terminal j in response to determining that a transmission time of broadcast information sent by the vehicle terminal i is within an aging time of the broadcast message.

6. The method according to claim 1, wherein when the link quality of the $R_{ij}$ is lower than the preset threshold, the method further comprises:

when it is determined that a transmission time of broadcast information sent by the vehicle terminal i exceeds an aging time of the broadcast message, discarding the broadcast information sent by the vehicle terminal i.

7. The method according to claim 1, wherein the broadcast message sent by the vehicle terminal i is forwarded to the vehicle terminal j in response to determining that a message identifier of the broadcast message sent by the vehicle terminal i is identical to an identifier of an initially-sent message, and that content of the broadcast message sent by the vehicle terminal i is different from that of another broadcast message, wherein the another broadcast message is a broadcast message sent by a vehicle terminal other than the vehicle terminal i.

8. The method according to claim 1, wherein when the link quality of the $R_{ij}$ is lower than the preset threshold, the method further comprises:

when it is determined that a message identifier of the broadcast message sent by the vehicle terminal i is identical to an identifier of an initially-sent message, and that content of the broadcast message sent by the vehicle terminal i is the same as that of another broadcast message, discarding the broadcast message sent by the vehicle terminal i, wherein the another broadcast message is a broadcast message sent by a vehicle terminal other than the vehicle terminal i, and a message identifier of the another broadcast message is not identical to an identifier of an initially-sent message.

9. A relay transmission method, comprising:

receiving, by a relay terminal, broadcast messages having vehicle location information from N vehicle terminals, wherein N is an integer greater than 1;

determining, based on the vehicle location information, a vehicle located between a vehicle terminal i and a vehicle terminal j of the N vehicle terminals;

calculating link quality of a communication link $R_{ij}$ based on vehicle size information corresponding to the vehicle, wherein the $R_{ij}$ is a communication link used when the vehicle terminal i and the vehicle terminal j communicate with each other; and if the link quality of the $R_{ij}$ is lower than a preset threshold of a broadcast message sent by the vehicle terminal i to the vehicle terminal j, forwarding the broadcast message sent by the vehicle terminal i to the vehicle terminal j, and forwarding the broadcast message sent by the vehicle terminal j to the vehicle terminal i, including based on load information of a network forwarding link, determining a forwarding frequentness, and forwarding the broadcast message sent by the vehicle terminal i to the vehicle terminal j, wherein the network forwarding link is a communication link used when the relay terminal and the vehicle terminal j communicate with each other.

10. A relay transmission method, comprising:

receiving, by a relay terminal, broadcast messages having vehicle location information from N vehicle terminals, wherein N is an integer greater than 1;

determining, based on the vehicle location information, a vehicle located between a vehicle terminal i and a vehicle terminal j of the N vehicle terminals;

calculating link quality of a communication link $R_{ij}$ based on vehicle size information corresponding to the vehicle, wherein $R_{ij}$ is a communication link used when the vehicle terminal i and the vehicle terminal j communicate with each other, and if the link quality of the $R_{ij}$ is lower than a preset threshold of a broadcast message sent by the vehicle terminal i to the vehicle terminal j, forwarding the broadcast message sent by the vehicle terminal i to the vehicle terminal j, and forwarding the broadcast message sent by the vehicle terminal j to the vehicle terminal i, including when the relay terminal has a plurality of broadcast messages to be sent to the vehicle terminal j, determining priorities of the plurality of broadcast messages based on message properties of the broadcast messages; and based on load information of a network forwarding link, determining a forwarding frequentness, and forwarding the plurality of broadcast messages to the vehicle terminal j according to the priorities of the broadcast messages, wherein the network forwarding link is a communication link used when the relay terminal and the vehicle terminal j communicate with each other.

11. A relay terminal, comprising:

a receiving unit configured to receive broadcast messages from N vehicle terminals, wherein each broadcast message comprises vehicle location information, and N is a positive integer greater than 1;

a first determining unit configured to determine, based on the vehicle location information in the broadcast messages, a vehicle located between a vehicle terminal i and a vehicle terminal j of the N vehicle terminals;

a calculation unit configured to calculate link quality of a communication link $R_{ij}$ based on vehicle size information corresponding to the vehicle, wherein the $R_{ij}$ is a communication link used when the vehicle terminal i and the vehicle terminal j communicate with each other; and a forwarding unit configured to: if the link quality of the $R_{ij}$ is lower than a preset threshold, forward a broadcast message sent by the vehicle terminal i to the vehicle terminal j, and forward a broadcast message sent by the vehicle terminal j to the vehicle terminal i, wherein when the link quality of the $R_{ij}$ is lower than the preset threshold, the relay terminal further comprises:

a prediction unit configured to predict a duration for which the link quality of the $R_{ij}$ is lower than the preset threshold, based on the vehicle, vehicle driving information corresponding to the vehicle terminal i, and vehicle driving information corresponding to the vehicle terminal j, wherein the forwarding unit is further configured to: within the duration, forward the broadcast message sent by the vehicle terminal i to the vehicle terminal j, and forward the to-be-forwarded broadcast message sent by the vehicle terminal j to the vehicle terminal i, wherein the vehicle driving information comprises vehicle driving speed information and vehicle driving direction information.

12. The relay terminal according to claim 11, wherein the relay terminal further comprises:

a sending unit configured to send a relay capability indication message to a base station, wherein the relay capability indication message is used to indicate a relay capability and/or a relay location of the relay terminal, wherein the receiving unit is further configured to receive relay configuration information from the base station, wherein the relay configuration information is used to instruct to enable a relay function of the relay terminal; and an enabling unit configured to enable the relay function of the relay terminal as instructed by the relay configuration information.

13. The relay terminal according to claim 11, wherein the first determining unit is configured to determine, based on the vehicle location information in combination with map information, obstacles located between the vehicle terminal i and the vehicle terminal j, wherein the obstacles comprise the vehicle and a fixed obstacle; and the calculation unit is configured to calculate the link quality of the communication link $R_{ij}$ based on the vehicle size information corresponding to the vehicle and size information corresponding to the fixed obstacle.

14. The relay terminal according to claim 11, wherein the relay terminal further comprises:

a second determining unit configured to: when it is determined that a message identifier of a broadcast message sent by the vehicle terminal i is identical to an identifier of an initially-sent message, determine that the broadcast message sent by the vehicle terminal i needs to be forwarded.

15. The relay terminal according to claim 11, wherein the broadcast message comprises an aging time, and the relay terminal further comprises:

a second determining unit configured to: when it is determined that a transmission time of broadcast information sent by the vehicle terminal i is within an aging time of the broadcast message, determine that the broadcast message sent by the vehicle terminal i needs to be forwarded.

16. The relay terminal according to claim 11, wherein the broadcast message comprises an aging time, and when the link quality of the $R_{ij}$ is lower than the preset threshold, the relay terminal further comprises:

a first discarding unit configured to: when it is determined that a transmission time of broadcast information sent by the vehicle terminal i exceeds an aging time of the broadcast message, discard the broadcast information sent by the vehicle terminal i.

17. The relay terminal according to claim 11, wherein the relay terminal further comprises:

a second determining unit configured to: when it is determined that a message identifier of a broadcast message sent by the vehicle terminal i is identical to an identifier of an initially-sent message, and that content of the broadcast message sent by the vehicle terminal i is different from that of another broadcast message, determine that the broadcast message sent by the vehicle terminal i needs to be forwarded, wherein the another broadcast message is a broadcast message sent by a vehicle terminal other than the vehicle terminal i.

18. A non-transitory computer readable medium having instructions stored therein, which when executed by a processor, cause the processor to perform operations, the operations comprising:

receiving, by a relay terminal, broadcast messages having vehicle location information from N vehicle terminals, wherein N is an integer greater than 1;

determining, based on the vehicle location information, a vehicle located between a vehicle terminal i and a vehicle terminal j of the N vehicle terminals;

calculating link quality of a communication link $R_{ij}$ based on vehicle size information corresponding to the vehicle, wherein the $R_{ij}$ is a communication link used when the vehicle terminal i and the vehicle terminal j communicate with each other;

if the link quality of the $R_{ij}$ is lower than a preset threshold of a broadcast message sent by the vehicle terminal I to the vehicle terminal j, predicting a duration for which the link quality of the $R_{ij}$ is lower than the preset threshold, based on the vehicle, vehicle driving information corresponding to the vehicle terminal i, and vehicle driving information corresponding to the vehicle terminal j; and within the duration, forwarding the broadcast message sent by the vehicle terminal i to the vehicle terminal j, and forwarding the broadcast message sent by the vehicle terminal j to the vehicle terminal i, wherein the vehicle driving information comprises vehicle driving speed information and vehicle driving direction information.

\* \* \* \* \*

UNITED STATES PATENT AND TRADEMARK OFFICE
CERTIFICATE OF CORRECTION

PATENT NO. : 10,827,327 B2
APPLICATION NO. : 16/414743
DATED : November 3, 2020
INVENTOR(S) : Zhe Wang, Jun Zhang and Guangri Chen Page 1 of 1

It is certified that error appears in the above-identified patent and that said Letters Patent is hereby corrected as shown below:

In the Claims

In Claim 1, Column 32, Line 49, delete "present" and insert --preset--.

In Claim 10, Column 34, Line 37, delete "wherein Rij is" and insert --wherein the Rij is--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*